(12) United States Patent
Kim et al.

(10) Patent No.: US 11,934,064 B2
(45) Date of Patent: Mar. 19, 2024

(54) DISPLAY APPARATUS AND LIGHT SOURCE APPARATUS THEREOF

(71) Applicant: SAMSUNG ELECTRONICS CO., LTD., Suwon-si (KR)

(72) Inventors: Taeyeon Kim, Suwon-si (KR); Sungyeol Kim, Suwon-si (KR); Hyungsuk Kim, Suwon-si (KR); Chunsoon Park, Suwon-si (KR); Youngmin Lee, Suwon-si (KR); Hyukjun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/101,898

(22) Filed: Jan. 26, 2023

(65) Prior Publication Data

US 2023/0314870 A1    Oct. 5, 2023

Related U.S. Application Data

(63) Continuation of application No. PCT/KR2023/000468, filed on Jan. 11, 2023.

(30) Foreign Application Priority Data

Mar. 29, 2022 (KR) .................... 10-2022-0039225
Jun. 9, 2022  (KR) .................... 10-2022-0070393

(51) Int. Cl.
*G02F 1/1335*    (2006.01)
*G02F 1/13357*   (2006.01)
(Continued)

(52) U.S. Cl.
CPC .. *G02F 1/133601* (2021.01); *G02F 1/133603* (2013.01); *G02F 1/133612* (2021.01);
(Continued)

(58) Field of Classification Search
CPC ......... G02F 1/133601; G02F 1/133612; G02F 1/133603; G02F 2203/48; H05B 45/10;
(Continued)

(56) References Cited

U.S. PATENT DOCUMENTS 7,648,254 B2    1/2010  Yoo et al.
7,936,415 B2    5/2011  Park
(Continued)

FOREIGN PATENT DOCUMENTS

CN    204168599 U      2/2015
KR    10-0755615 B1    9/2007
(Continued)

OTHER PUBLICATIONS

Written Opinion (PCT/ISA/237) dated Apr. 28, 2023 from the International Searching Authority in International Application No. PCT/KR2023/000468.

(Continued)

*Primary Examiner* — Anne M Hines
(74) *Attorney, Agent, or Firm* — Sughrue Mion, PLLC

(57) ABSTRACT

A display apparatus includes: a liquid crystal panel; a plurality of light sources configured to emit light; and a substrate including a plurality of dimming blocks arranged in rows and columns, wherein each of the plurality of dimming blocks includes at least four light sources from among the plurality of light sources, and the least four light sources are connected in series with each other and arranged in rows and columns on a first surface of the substrate, the substrate includes a plurality of holes extending from the first surface of the substrate to a second surface of the substrate, the first surface of the substrate and the second surface of the substrate are electrically connected through the plurality of holes, and each of the plurality of holes is in a region surrounded by the at least four light sources of each (Continued)

respective dimming block of the plurality of dimming blocks.

20 Claims, 22 Drawing Sheets

(51) Int. Cl.
    *G09G 3/3233*         (2016.01)
    *G09G 3/34*            (2006.01)
    *G09G 3/36*            (2006.01)
    *H05B 45/10*          (2020.01)

(52) U.S. Cl.
    CPC ......... *G09G 3/3233* (2013.01); *G09G 3/3406* (2013.01); *G09G 3/36* (2013.01); *H05B 45/10* (2020.01); *G02F 2203/48* (2013.01); *G09G 2300/0842* (2013.01); *G09G 2320/0233* (2013.01); *G09G 2320/0686* (2013.01)

(58) Field of Classification Search
    CPC ...... G09G 3/3233; G09G 3/3406; G09G 3/36; G09G 2300/0842; G09G 2320/0233; G09G 2320/0686
    See application file for complete search history.

(56) References Cited

U.S. PATENT DOCUMENTS

| | | | |
|---|---|---|---|
| 7,976,210 | B2 | 7/2011 | Shinozaki |
| 8,277,067 | B2 | 10/2012 | Park et al. |
| 8,388,162 | B2 | 3/2013 | Park |
| 8,994,701 | B2 | 3/2015 | Kang |
| 9,207,490 | B2 | 12/2015 | Choi et al. |
| 9,836,999 | B2 * | 12/2017 | Nall ................. G09F 13/0418 |
| 11,417,287 | B2 | 8/2022 | Kim et al. |
| 2009/0065797 | A1 | 3/2009 | Kim et al. |
| 2009/0316389 | A1 * | 12/2009 | Park ................. G02F 1/133603 |
| | | | 362/382 |

FOREIGN PATENT DOCUMENTS

| | | |
|---|---|---|
| KR | 10-2008-0018308 A | 2/2008 |
| KR | 10-2008-0106471 A | 12/2008 |
| KR | 10-0872696 B1 | 12/2008 |
| KR | 10-2009-0021983 A | 3/2009 |
| KR | 10-2012-0103004 A | 9/2012 |
| KR | 10-1462728 B1 | 11/2014 |
| KR | 10-1545939 B1 | 8/2015 |
| KR | 10-1596791 B1 | 2/2016 |
| KR | 10-2296788 B1 | 9/2021 |
| KR | 10-2361974 B1 | 2/2022 |
| WO | 2022/059870 A1 | 3/2022 |

OTHER PUBLICATIONS

International Search Report (PCT/ISA/210) dated Apr. 28, 2023 from the International Searching Authority in International Application No. PCT/KR2023/000468.

Communication dated Aug. 17, 2023 by the Korean Patent Office in Korean Application No. 10-2022-0070393.

* cited by examiner

DISPLAY APPARATUS AND LIGHT SOURCE APPARATUS THEREOF

CROSS-REFERENCE TO RELATED APPLICATION(S)

This application is a continuation application, under 35 U.S.C. §111(a), of international application No. PCT/KR2023/000468, filed on Jan. 11, 2023, which claims priority to Korean Patent Application Nos. 10-2022-0039225 filed on Mar. 29, 2022 and 10-2022-0070393 filed on Jun. 9, 2022 in the Korean Intellectual Property Office, the disclosures of which is incorporated by reference herein in its entirety.

BACKGROUND

1. Field

The disclosure relates to a display apparatus and a light source apparatus thereof, and more particularly, to a display apparatus configured to perform local dimming and a light source apparatus thereof.

2. Description of Related Art.

Generally, a display apparatus is a kind of an output apparatus that converts obtained or stored electrical information into visual information and displays the visual information to a user, and the display apparatus is used in various fields, such as the home or workplace.

The display apparatus includes a monitor apparatus connected to a personal computer or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

The display apparatus (self-emissive display or non-emissive display) includes a light source apparatus to convert electrical information into visual information, and the light source apparatus includes a plurality of light sources configured to independently emit light. The light source may include a light emitting diode (LED) or an organic light emitting diode (OLED).

Particularly, local dimming technology is applied to a light source apparatus (backlight unit) of a non-emissive display to improve a contrast ratio of an image. A plurality of light sources is divided into a plurality of dimming blocks, and a driving device may control a driving current supplied to light sources included in one or more dimming blocks.

The driving devices and light sources (for example, light emitting diodes) may be fixed on a substrate using surface mount technology (SMT). A substrate, on which the driving devices and light sources are to be mounted, may be fixed to a SMT device (for example, chip mounter). In addition, holes into which carrier jigs for fixing the substrate to the SMT device are inserted may be formed on the substrate.

The holes may interfere with forming an electrically conductive line for supplying a driving current to the light sources from the driving devices.

SUMMARY

Provided are a display apparatus capable of allowing a hole, which is to fix a substrate to a surface mount technology (SMT) device, to be disposed at a position, in which interference with an electrically conductive line formed on the substrate is minimized, and a light source apparatus thereof.

In addition, provide are a display apparatus capable of electrically connecting a first surface and a second surface of a substrate by using a hole provided to fix the substrate to a SMT device, and a light source apparatus thereof.

In accordance with an aspect of the disclosure, a display apparatus includes: a liquid crystal panel; a plurality of light sources configured to emit light; and a substrate including a plurality of dimming blocks arranged in rows and columns, wherein each of the plurality of dimming blocks includes at least four light sources from among the plurality of light sources, and the least four light sources are connected in series with each other and arranged in rows and columns on a first surface of the substrate, the substrate includes a plurality of holes extending from the first surface of the substrate to a second surface of the substrate, the first surface of the substrate and the second surface of the substrate are electrically connected through the plurality of holes, and each of the plurality of holes is in a region surrounded by the at least four light sources of each respective dimming block of the plurality of dimming blocks.

The display apparatus may further include electrically conductive lines on the first surface of the substrate, wherein the electrically conductive lines pass between a first dimming block from among the plurality of dimming blocks and a second dimming block from among the plurality of dimming blocks.

The display apparatus may further include electrically conductive lines provided on the substrate and connecting in series the at least four light sources of each respective dimming block of the plurality of dimming blocks, wherein each of the plurality of holes is disposed between the electrically conductive lines.

Each dimming block of the plurality of dimming blocks may include nine light sources arranged in three rows and three columns, and the electrically conductive lines connect in series the nine light sources in a letter "S" shape or a number "2" shape.

The display apparatus may further include: a first driving device configured to control a driving current supplied to at least four light sources of in a first set of dimming blocks among the plurality of dimming blocks; and a second driving device configured to control a driving current supplied to at least four light sources of in a second set of dimming blocks among the plurality of dimming blocks, wherein the first set of dimming blocks, the second set of dimming blocks, the first driving device and the second driving device are disposed on the first surface of the substrate.

The display apparatus may further include first conductive lines provided on the first surface of the substrate, wherein the first set of dimming blocks and the second set of dimming blocks are arranged in a straight line, the first conductive lines extend from the first driving device to each dimming block of the first set of dimming blocks, and the first conductive lines are between the first set of dimming blocks and the second set of dimming blocks.

The display apparatus may further include second conductive lines configured to transmit a dimming signal to the first driving device, wherein the second conductive lines are provided on the first surface of the substrate between the first set of dimming blocks and the second set of dimming blocks.

The display apparatus display apparatus may further include first conductive lines disposed on the first surface of the substrate, wherein the first set of dimming blocks are arranged in a plurality of rows and a plurality of columns, the first conductive lines extend from the first driving device to each dimming block of the first set of dimming blocks, and the first conductive lines are between the first set of dimming blocks arranged in the plurality of rows and the plurality of columns.

The display apparatus display apparatus may further include second conductive lines configured to transmit a dimming signal to the first driving device, wherein the second conductive lines are provided on the first surface of the substrate between the first set of dimming blocks and the second set of dimming blocks.

The first driving device may be between the first set of dimming blocks, and the second driving device may be between the second set of dimming blocks.

A relative position of the first driving device in the first set of dimming blocks may be different from a relative position of the second driving device in the second dimming blocks.

Each of the first driving device and the second driving device may include: a first transistor including a control terminal; a capacitor connected to the control terminal of the first transistor; and a second transistor connected to the control terminal of the first transistor.

The display apparatus display apparatus may further include a ground plate provided on the second surface of the substrate and electrically connected to the plurality of holes.

Each light source of the plurality of light sources may include: a light emitting diode provided on the substrate in chip on board (COB) method; and an optical dome including a cross section having an arc shape or a semi-circular shape.

An intensity of a first light beam emitted from a respective light source of the plurality of light sources in a first direction perpendicular to the substrate is less than an intensity of a second light beam emitted from the respective light source of the plurality of light sources in a second direction that is different from the first direction.

According to an aspect of the disclosure, a display apparatus includes: a liquid crystal panel; a plurality of light sources configured to emit light; a substrate including a plurality of holes electrically connecting the first surface of the substrate to the second surface of the substrate; a plurality of dimming blocks provided on the first surface of the substrate and arranged in rows and columns, wherein each dimming block of the plurality of dimming blocks includes a second plurality of light sources from among the plurality of light sources, the second plurality of light sources of each dimming block of the plurality of dimming blocks are arranged in rows and columns on the first surface of the substrate, and each of the plurality of holes is in a region surrounded by the at least four light sources of each respective dimming block of the plurality of dimming blocks.

The display apparatus display apparatus may further include: a plurality of driving circuits provided on the first surface of the substrate, wherein each driving circuit of the plurality of driving circuits is configured to control a driving current supplied to at least one dimming block of the plurality of dimming blocks.

The display apparatus display apparatus may further include: a first plurality of conductive lines provided on the first surface of the substrate, wherein the second plurality of light sources of a respective dimming block of the plurality of dimming blocks are connected to one another in series by conductive lines from among the first plurality of conductive lines.

The display apparatus display apparatus may further include: a second plurality of conductive lines provided on the first surface of the substrate, wherein at least one conductive line from among the second plurality of conductive lines connects at least one driving circuit of the plurality of driving circuits to at least one dimming block of the plurality of dimming blocks, and the at least one conductive line from among the second plurality of conductive lines is between respective dimming blocks from among the plurality of dimming blocks.

The display apparatus display apparatus may further include: a third plurality of conductive lines provided on the first surface of the substrate, wherein at least one conductive line from among the third plurality of conductive lines is configured to transmit a dimming signal to the at least one driving circuit from among the plurality of driving circuits, and the at least one conductive line from among the third plurality of conductive lines is disposed between respective dimming blocks from among the plurality of dimming blocks.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
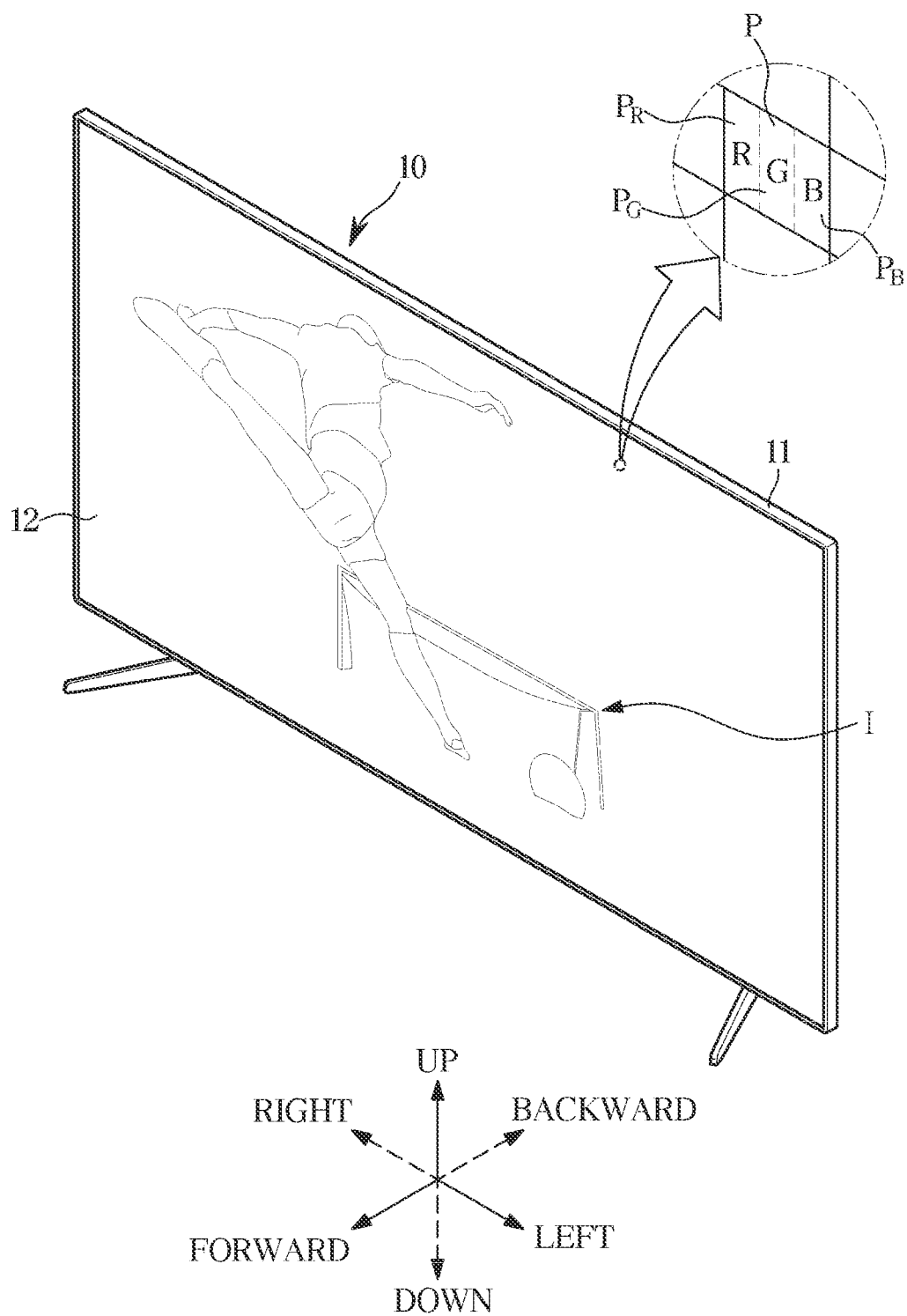
FIG. 1 illustrates an example of an appearance of a display apparatus according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" with or to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

Herein, the expression "at least one of a, b or c" indicates only a, only b, only c, both a and b, both a and c, both b and c, or all of a, b, and c.

It will be understood that, although the terms first, second, third, etc., may be used herein to describe various elements, the disclosure should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each step may be implemented in an order different from the illustrated order unless the context clearly indicates otherwise.

Hereinafter exemplary embodiments of the present disclosure will be described in detail with reference to the accompanying drawings.

FIG. 1 illustrates an example of an appearance of a display apparatus according to an embodiment of the disclosure.

A display apparatus 10 is a device that processes an image signal received from an outside source and visually displays the processed image. Hereinafter a case in which the display apparatus 10 is a television is exemplified, but the disclosure is not limited thereto. For example, the display apparatus 10 may be implemented in various forms, such as a monitor, a portable multimedia device, and a portable communication device, and the display apparatus 10 is not limited in its shape as long as it is capable of visually displaying an image.

The display apparatus 10 may be a large format display (LFD) installed outdoors, such as a roof of a building or a bus stop. The term "outdoors" is not limited to the outside of a building, and thus the display apparatus 10 according to an embodiment may be installed in any places as long as the display apparatus is accessed by a large number of people, even indoors, such as subway stations, shopping malls, movie theaters, companies, and stores.

The display apparatus 10 may receive content data including video data and audio data from various content sources and output video and audio corresponding to the video data and the audio data. For example, the display apparatus 10 may receive content data through a broadcast reception antenna or cable, receive content data from a content playback device, or receive content data from a content providing server of a content provider.

As illustrated in FIG. 1, the display apparatus 10 includes a body 11, and a screen 12 provided to display an image I.

The body 11 may form an appearance of the display apparatus 10, and the body 11 may include a component configured to allow the display apparatus 10 to display the image I and to perform various functions. Although the body 11 shown in FIG. 1 is in the form of a flat plate, the shape of the body 11 is not limited thereto. For example, the body 11 may have a curved plate shape.

The screen 12 may be formed on a front surface of the body 11, and display the image I. For example, the screen 12 may display a still image or a moving image. Further, the screen 12 may display a two-dimensional plane image or a three-dimensional image using binocular parallax of the user.

The screen 12 may include a self-emissive display (for example, a light emitting diode panel or an organic light emitting diode panel) configured to emit light directly or a non-emissive display (for example, a liquid crystal panel) configured to transmit or block light emitted from a light source apparatus (for example, a back light unit).

A plurality of pixels P may be formed on the screen 12 and the image I displayed on the screen 12 may be formed by a combination of the lights emitted from the plurality of pixels P. For example, the image I may be formed on the screen 12 by combining light emitted from the plurality of pixels P as a mosaic.

Each of the plurality of pixels P may emit different brightness and different color of light. In order to emit light in the various colors, the plurality of pixels P may include sub-pixels $P_R$, $P_G$, and $P_B$, respectively.

The sub-pixels $P_R$, $P_G$, and $P_B$ may include a red sub pixel $P_R$ emitting red light, a green sub pixel $P_G$ emitting green light, and a blue sub pixel $P_B$ emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel $P_R$, the green light of the green sub pixel $P_G$, and the blue light of the blue sub pixel $P_B$, each of the plurality of pixels P may emit different brightness and different colors of light.

Figure 2:
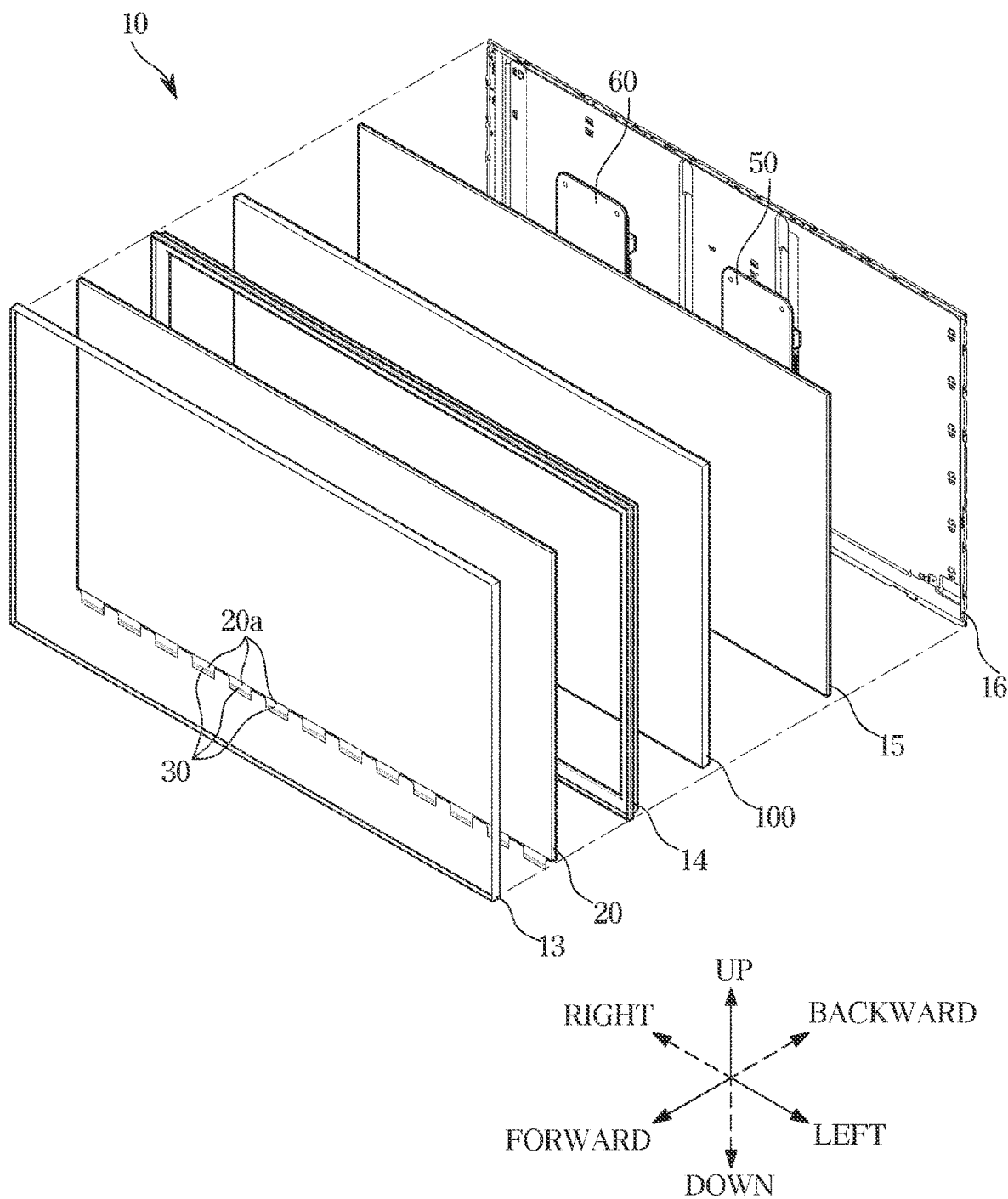
FIG. 2 illustrates an example of a structure of the display apparatus according to an embodiment of the disclosure.
Figure 3:
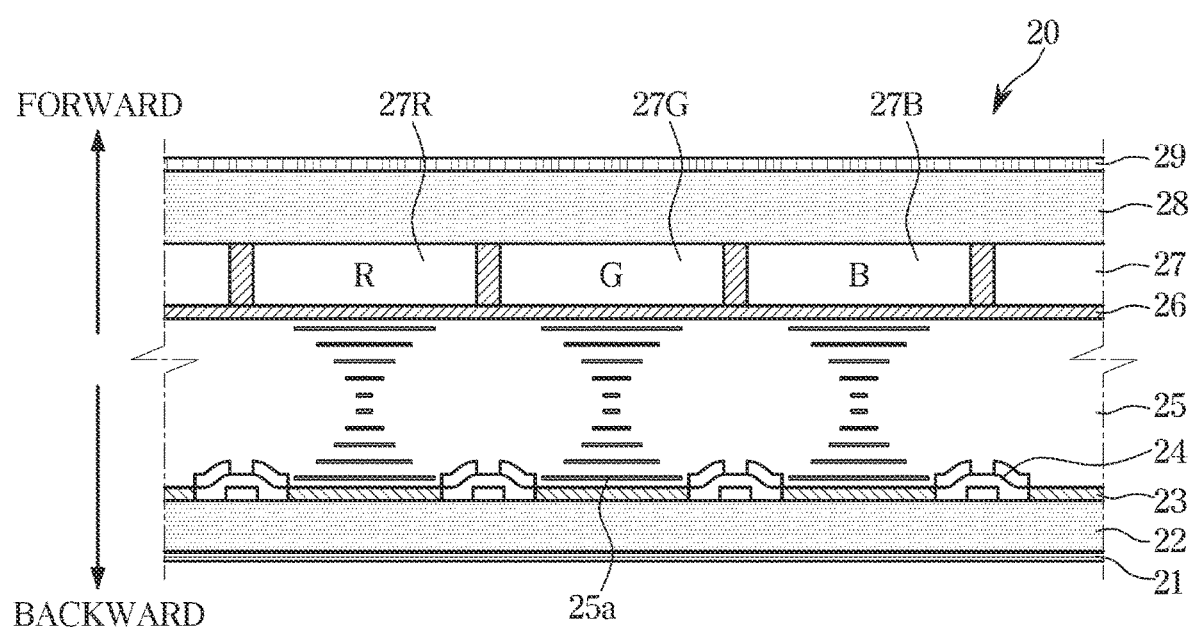
FIG. 3 illustrates an example of a liquid crystal panel included in the display apparatus according to an embodiment of the disclosure.

FIG. 2 illustrates an example of a structure of the display apparatus according to an embodiment of the disclosure. FIG. 3 illustrates an example of a liquid crystal panel included in the display apparatus according to an embodiment of the disclosure.

As shown in FIG. 2, various components configured to generate the image I on the screen 12 may be provided inside the body 11.

For example, the body 11 may include a light source apparatus 100 that is a surface light source, a liquid crystal panel 20 configured to block or transmit light emitted from the light source apparatus 100, a control assembly 50 configured to control an operation of the light source apparatus 100 and the liquid crystal panel 20, and a power assembly 60 configured to supply power to the light source apparatus 100 and the liquid crystal panel 20. Further, the body 11 may include a bezel 13, a frame middle mold 14, a bottom chassis 15, and a rear cover 16 which are provided to support and fix the liquid crystal panel 20, the light source apparatus 100, the control assembly 50 and the power assembly 60.

The light source apparatus 100 may include a point light source configured to emit monochromatic light or white light. The light source apparatus 100 may refract, reflect, and scatter light emitted from the point light source so as to convert the light emitted from the point light source to surface light. As mentioned above, the light source apparatus 100 may refract, reflect, and scatter light emitted from the point light source, thereby emitting uniform surface light toward the front.

A configuration of the light source apparatus 100 will be described in more detail below.

The liquid crystal panel 20 is provided in front of the light source apparatus 100 and blocks or transmits light emitted from the light source apparatus 100 to form the image I.

A front surface of the liquid crystal panel 20 may form the screen 12 of the display apparatus 10 described above, and the liquid crystal panel 20 may form the plurality of pixels P. In the liquid crystal panel 20, the plurality of pixels P may independently block or transmit light from the light source apparatus 100. The light transmitted through the plurality of pixels P may form the image I displayed on the screen 12.

For example, as shown in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 are provided on the outside of the first and second transparent substrates 22 and 28. Each of the first polarizing film 21 and the second polarizing film 29 may transmit a specific light beam and block (reflect or absorb) other light beams. For example, the first polarizing film 21 may transmit a light beam in a first direction and block (reflect or absorb) other light beams. In addition, the second polarizing film 29 may transmit a light beam in a second direction and block (reflect or absorb) other light beams. In this case, the first direction and the second direction may be perpendicular to each other. Therefore, the polarized light passing through the first polarizing film 21 may not pass through the second polarizing film 29.

The color filter 27 may be provided inside the second transparent substrate 28. The color filter 27 may include a red filter 27R transmitting red light, a green filter 27G transmitting green light, and a blue filter 27B transmitting blue light. The red filter 27R, the green filter 27G, and the blue filter 27B may be disposed parallel to each other. A region, in which the color filter 27 is formed, corresponds to the pixel P described above. A region, in which the red filter 27R is formed, corresponds to the red sub-pixel $P_R$, a region, in which the green filter 27G is formed, corresponds to the green sub-pixel $P_G$, and a region, in which the blue filter 27B is formed, corresponds to the blue sub-pixel $P_B$.

The pixel electrode 23 may be provided inside the first transparent substrate 22, and the common electrode 26 may be provided inside the second transparent substrate 28. The pixel electrode 23 and the common electrode 26 may be formed of a metal material through which electricity is conducted, and the pixel electrode 23 and the common electrode 26 may generate an electric field to change the arrangement of liquid crystal molecules 25a forming the liquid crystal layer 25 as described below.

The thin film transistor (TFT) 24 is provided inside the first transparent substrate 22. The TFT 24 may transmit or block a current flowing through the pixel electrode 23. For example, an electric field may be formed or removed between the pixel electrode 23 and the common electrode 26 in response to turning on (closing) or turning off (opening) the TFT 24.

The liquid crystal layer 25 is formed between the pixel electrode 23 and the common electrode 26, and the liquid crystal layer 25 is filled with the liquid crystal molecules 25a. Liquid crystals represent an intermediate state between a solid (crystal) and a liquid. Liquid crystals also exhibit optical properties according to changes in an electric field. For example, in the liquid crystal, the orientation of molecules forming the liquid crystal may change according to a change in an electric field. As a result, the optical properties of the liquid crystal layer 25 may vary depending on the presence or absence of the electric field passing through the liquid crystal layer 25.

A cable 20a configured to transmit image data to the liquid crystal panel 20, and a display driver integrated circuit (DDI) (hereinafter referred to as 'panel driver') 30 configured to process digital image data and output an analog image signal are provided at one side of the liquid crystal panel 20.

The cable 20a may electrically connect the control assembly 50 and the power assembly 60 to the panel driver 30, and may also electrically connect the panel driver 30 to the liquid crystal panel 20. The cable 20a may include a flexible flat cable or a film cable that is bendable.

The panel driver 30 may receive image data and power from the control assembly 50 and the power assembly 60 through the cable 20a. The panel driver 30 may transmit the image data and driving current to the liquid crystal panel 20 through the cable 20a.

In addition, the cable 20a and the panel driver 30 may be integrally implemented as a film cable, a chip on film (COF), or a tape carrier package (TCP). In other words, the panel driver 30 may be disposed on the cable 20a. However, the disclosure is not limited thereto, and the panel driver 30 may be disposed on the liquid crystal panel 20.

The control assembly 50 may include a control circuit configured to control an operation of the liquid crystal panel 20 and the light source apparatus 100. For example, the control circuit may process a video signal and/or audio signal from an external content source. The control circuit may transmit image data to the liquid crystal panel 20, and transmit dimming data to the light source apparatus 100.

The power assembly 60 may include a power circuit configured to supply power to the liquid crystal panel 20 and the light source apparatus 100. The power circuit may supply power to the light source apparatus 100 to allow the light source apparatus 100 to output surface light. The power circuit may supply power to the liquid crystal panel 20 to allow the liquid crystal panel 20 to block or transmit the light of the light source apparatus 100.

The control assembly 50 and the power assembly 60 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

Figure 4:
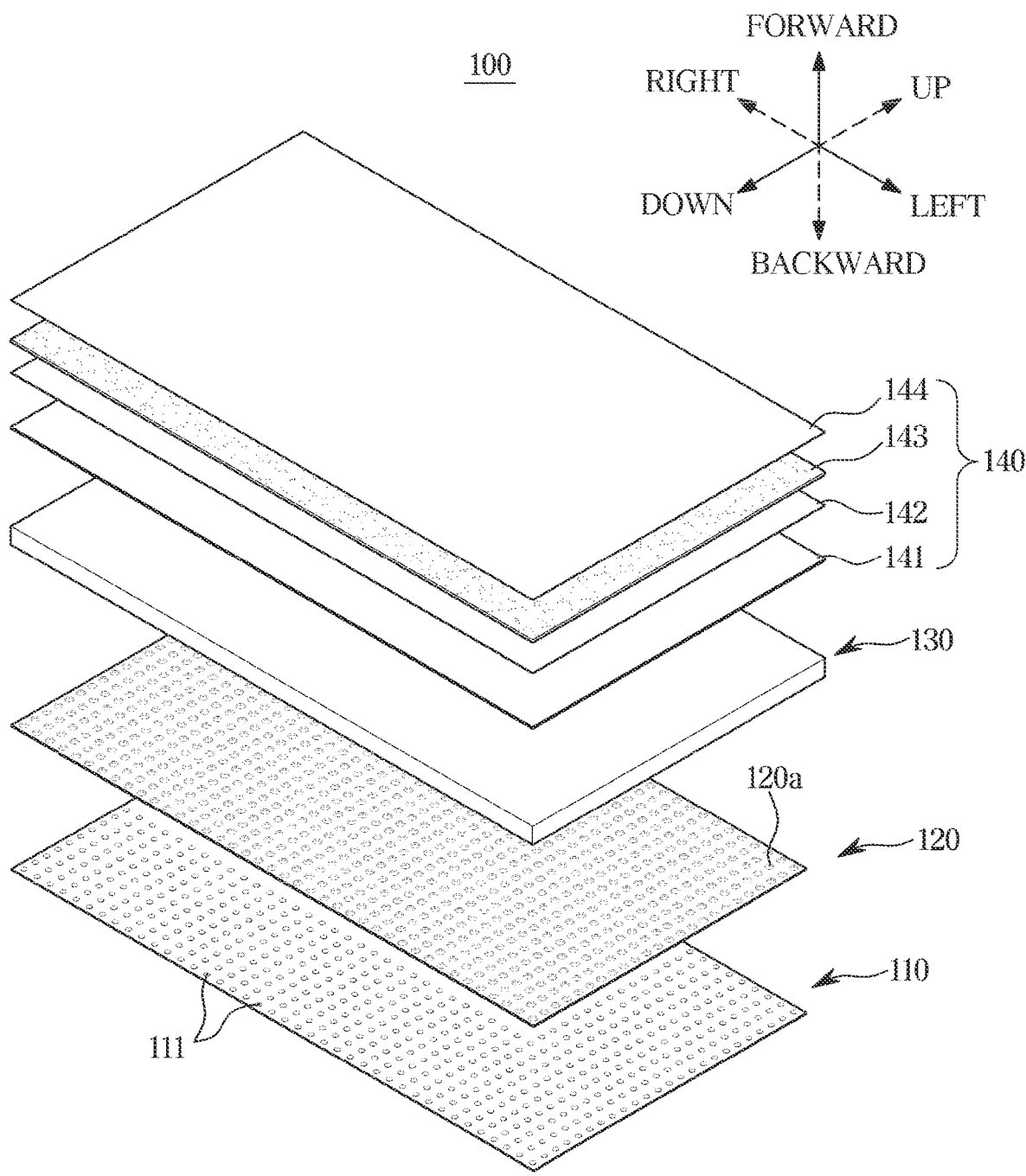
FIG. 4 illustrates an example of a light source apparatus included in the display apparatus according to an embodiment of the disclosure.
Figure 5:
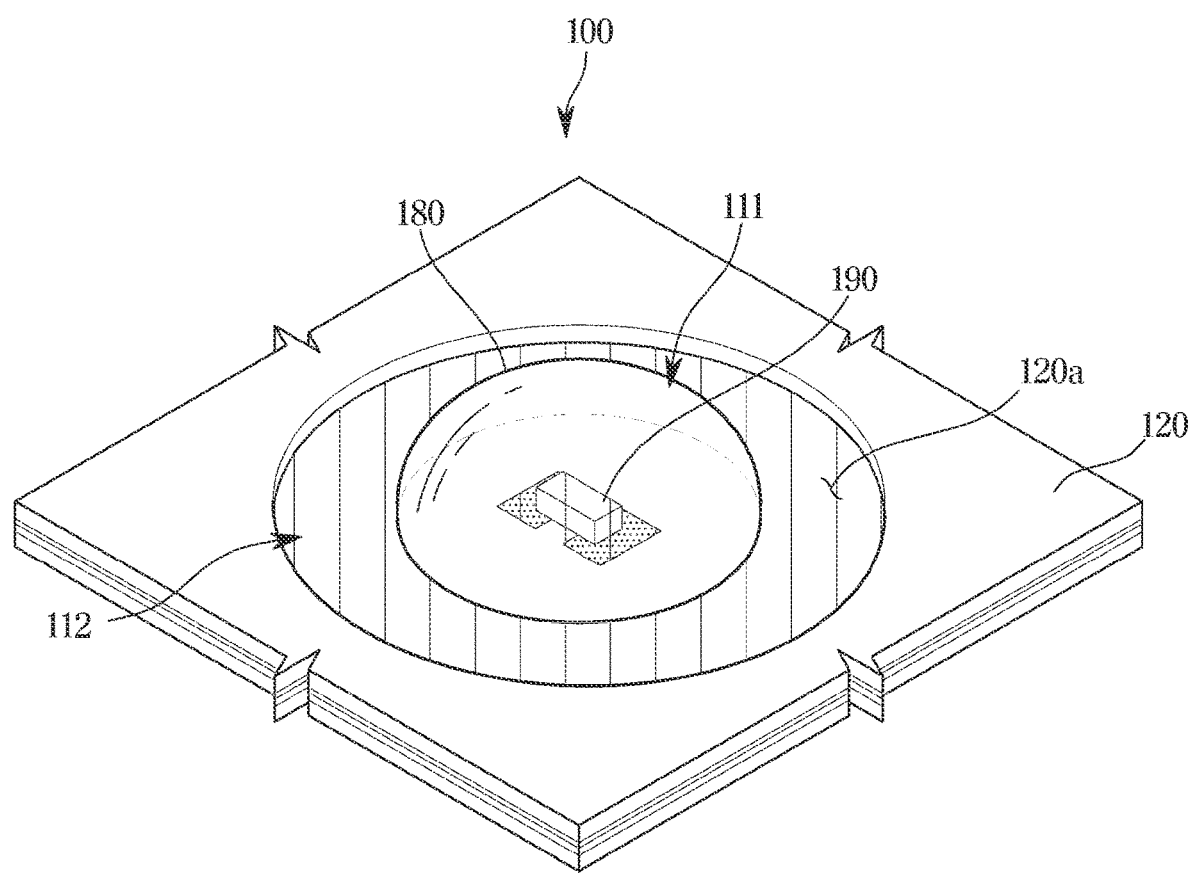
FIG. 5 illustrates an example of a light source included in the light source apparatus according to an embodiment of the disclosure.

FIG. 4 illustrates an example of a light source apparatus included in the display apparatus according to an embodiment of the disclosure. FIG. 5 illustrates an example of a light source included in the light source apparatus according to an embodiment of the disclosure.

As illustrated in FIG. 4, the light source apparatus 100 may include a light source module 110 configured to generate light, a reflective sheet 120 configured to reflect light, a diffuser plate 130 configured to uniformly diffuse light, and an optical sheet 140 configured to improve a luminance of light that is emitted.

The light source module 110 may include a plurality of light sources 111 configured to emit light, and a substrate 112 provided to support/fix the plurality of light sources 111.

The plurality of light sources 111 may be disposed in a predetermined pattern to allow light to be emitted with uniform luminance. The plurality of light sources 111 may be disposed in such a way that a distance between one light source and light sources adjacent thereto is the same.

For example, as shown in FIG. 4, the plurality of light sources 111 may be arranged in rows and columns. Accordingly, the plurality of light sources may be disposed such that an approximate square is formed by four adjacent light sources. In addition, any one light source may be disposed adjacent to four light sources, and a distance between one light source and four adjacent light sources may be approximately the same.

Alternatively, the plurality of light sources may be disposed such that an approximately equilateral triangle is formed by three adjacent light sources. In this case, one light source may be disposed adjacent to six light sources, and a distance between one light source and six adjacent light sources may be approximately the same.

However, the pattern in which the plurality of light sources 111 is disposed is not limited to the patterns described above, and the plurality of light sources 111 may be disposed in various patterns to allow light to be emitted with uniform luminance.

The light source 111 may employ an element configured to emit monochromatic light (light of a specific wavelength, or a light of a single peak wavelength, for example, blue light) or white light (light of a plurality of peak wavelengths, for example light of a mixture of red light, green light, and blue light) in various directions by receiving power.

Each of the plurality of light sources 111 may include a light emitting diode (LED) 190 and an optical dome 180.

In order to reduce a thickness of the display apparatus 10, it is required to reduce a thickness of the light source apparatus 100. It is required to reduce a thickness of the plurality of light sources 111 so as to reduce the thickness of the optical device 100, thereby simplifying a structure thereof.

The LED 190 may be directly attached to the substrate 112 in a Chip On Board (COB) method. In other words, the light source 111 may include the LED 190 to which a light emitting diode chip or a light emitting diode die is directly attached to the substrate 112 without an additional packaging.

The LED 190 may be manufactured as a flip chip type LED. As for the flip-chip type LED 190, when adhering a light emitting diode corresponding to a semiconductor element to the substrate 112, an electrode pattern of the semiconductor element may be fused to the substrate 112 as it is, without using intermediate media such as a metal lead (wire) or ball grid array (BGA). Accordingly, because the metal lead (wire) or the ball grid array is omitted, it is possible to reduce the size of the light source 111 including the flip-chip type LED 190.

In the above description, the flip-chip type LED 190 that is directly fused to the substrate 112 in a chip-on-board method is described, but the light source 111 is not limited to a flip-chip type LED. Alternatively, the light source 111 may include a package type LED.

The optical dome 180 may cover the LED 190. The optical dome 180 may prevent or suppress damages to the LED 190 caused by an external mechanical action and/or damage to the LED 190 caused by a chemical action.

The optical dome 180 may have a dome shape formed in such a way that a sphere is cut into a surface not including the center thereof, or may have a hemispherical shape in such a way that a sphere is cut into a surface including the center thereof. A vertical cross section of the optical dome 180 may be an arc shape or a semicircle shape.

The optical dome 180 may be formed of silicone or epoxy resin. For example, the molten silicon or epoxy resin may be discharged onto the LED 190 through a nozzle, and the discharged silicon or epoxy resin may be cured, thereby forming the optical dome 180.

Accordingly, the shape of the optical dome 180 may vary depending on the viscosity of the liquid silicone or epoxy resin. For example, in a state in which the optical dome 180 is manufactured using silicon having a thixotropic index of about 2.7 to 3.3 (appropriately, 3.0), the optical dome 180 may include a dome ratio, indicating a ratio of a height of a dome to a diameter of a base of the dome (the height of the dome/a diameter of the base), of approximately 0.25 to 0.31 (appropriately 0.28).

The optical dome 180 may be optically transparent or translucent. Light emitted from the LED 190 may be emitted to the outside by passing through the optical dome 180.

In this case, the dome-shaped optical dome 180 may refract light like a lens. For example, light emitted from the LED 190 may be refracted by the optical dome 180 and thus may be dispersed.

As mentioned above, the optical dome 180 may disperse light emitted from the LED 190 as well as protecting the LED 190 from external mechanical and/or chemical or electrical actions.

In the above description, although the optical dome 180 in the form of a silicon dome is described, the light source 111 is not limited to including the optical dome 180. Alternatively, the light source 111 may include a lens for dispersing light emitted from the LED.

The substrate 112 may fix the plurality of light sources 111 to prevent a change in the position of the light source 111. Further, the substrate 112 may supply power, which is for the light source 111 to emit light, to the light source 111.

The substrate 112 may fix the plurality of light sources 111. The substrate 112 may be provided with synthetic resin or tempered glass or a printed circuit board (PCB) on which a conductive power supply line for supplying power to the light source 111 is formed.

The reflective sheet 120 may reflect light emitted from the plurality of light sources 111 to a front side or to a direction close to the front side.

In the reflective sheet 120, a plurality of through holes 120a is formed at positions corresponding to each of the plurality of light sources 111 of the light source module 110. In addition, the light source 111 of the light source module 110 may pass through the through hole 120a and protrude to the front of the reflective sheet 120. Accordingly, the plurality of light sources 111 may emit light in front of the reflective sheet 120. The reflective sheet 120 may reflect light, which is emitted toward the reflective sheet 120 from the plurality of light sources 111, toward the diffuser plate 130.

The diffuser plate 130 may be provided in front of the light source module 110 and the reflective sheet 120, and may evenly distribute the light emitted from the light source 111 of the light source module 110.

As described above, the plurality of light sources 111 is disposed at equal intervals on the rear surface of the light source apparatus 100, and thus unevenness in luminance may occur depending on the positions of the plurality of light sources 111.

Within the diffuser plate 130, the diffuser plate 130 may diffuse light emitted from the plurality of light sources 111 to remove unevenness in luminance caused by the plurality of light sources 111. In other words, the diffuser plate 130 may uniformly emit uneven light of the plurality of light sources 111 to the front surface.

The optical sheet 140 may include various sheets for improving luminance and luminance uniformity. For example, the optical sheet 140 may include a light conversion sheet 141, a diffusion sheet 142, a prism sheet 143, and a reflective polarizing sheet 144.

The sheets or films included in the optical sheet 140 is not limited to the sheets or films shown in FIG. 4, and the optical sheet 140 may include more various sheets, such as a protective sheet, or films.

Figure 6:
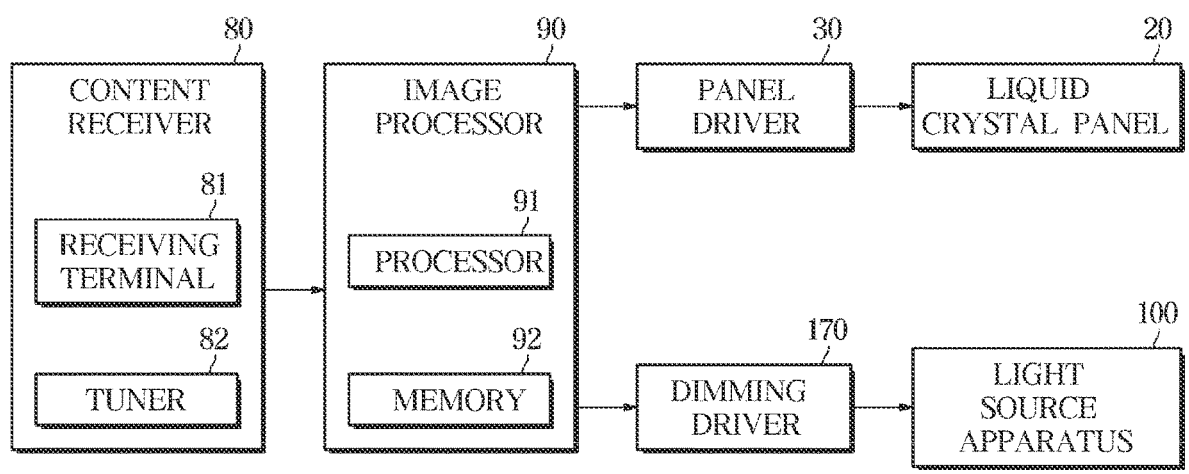
FIG. 6 illustrates an example of a configuration of the display apparatus according to an embodiment of the disclosure.
Figure 7:
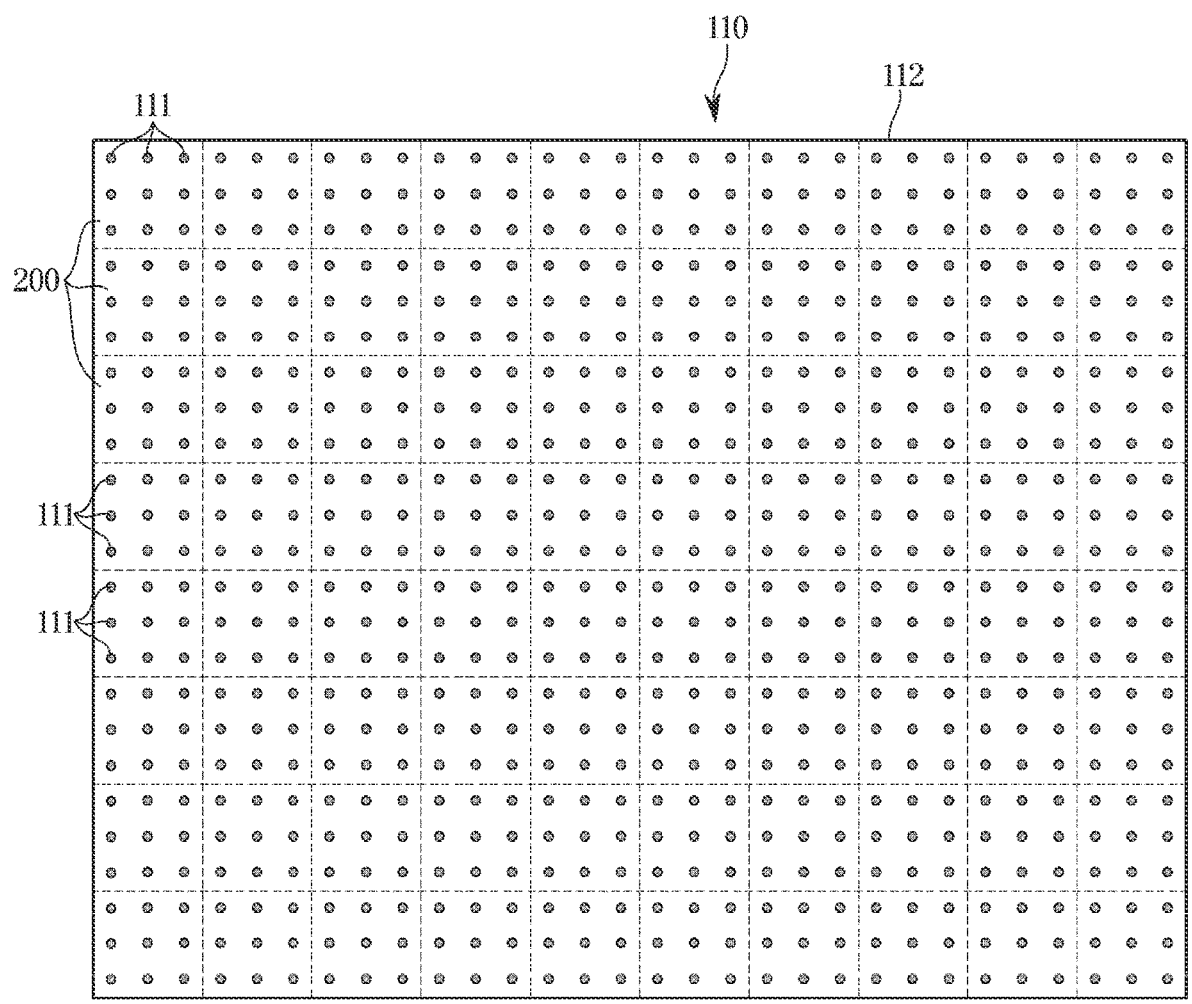
FIG. 7 illustrates an example of a dimming block of the light source apparatus included in the display apparatus according to an embodiment of the disclosure.
Figure 8:
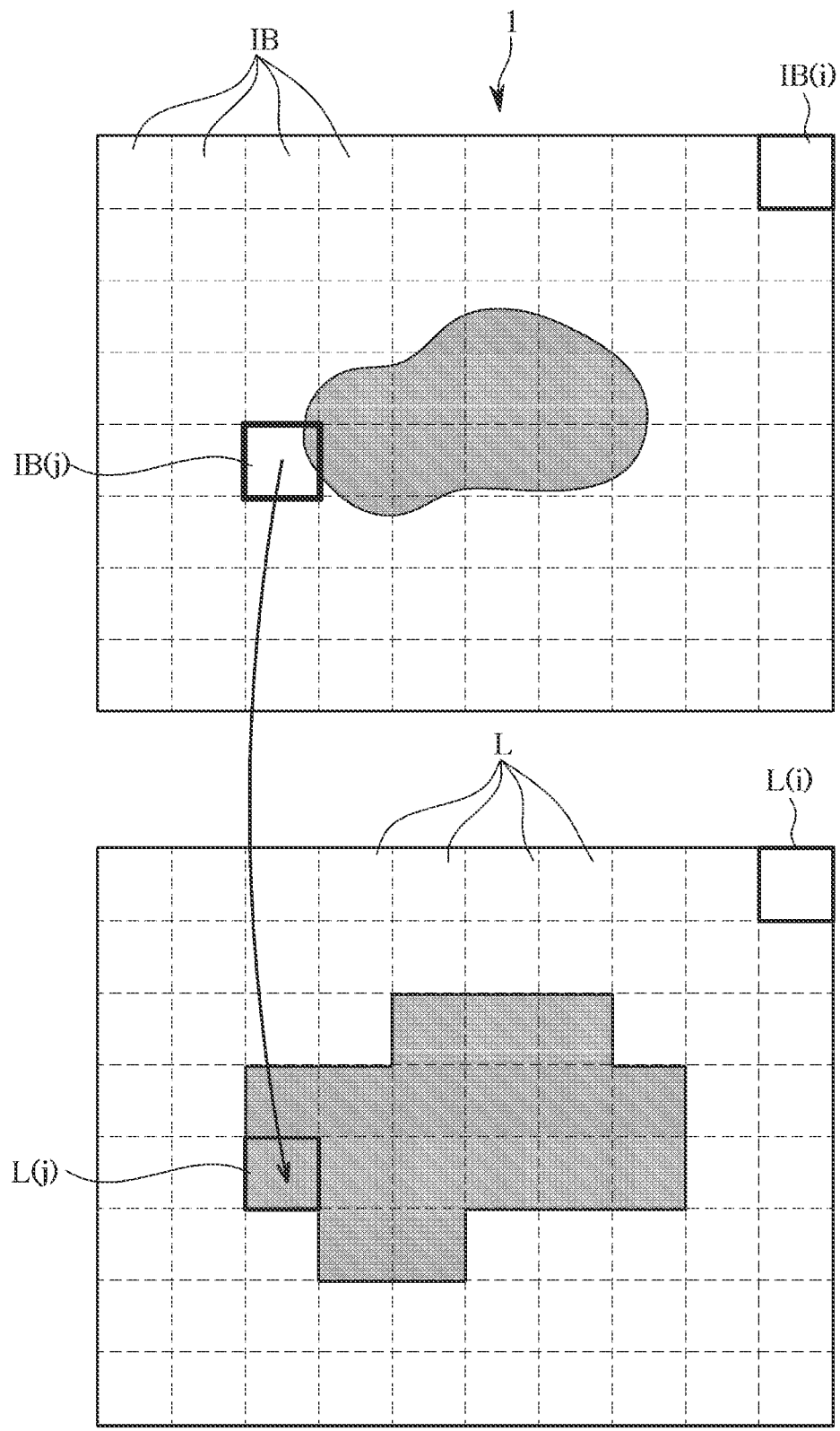
FIG. 8 illustrates an example in which the display apparatus according to an embodiment converts image data to dimming data.

FIG. 6 illustrates an example of a configuration of the display apparatus according to an embodiment of the disclosure. FIG. 7 illustrates an example of a dimming block of the light source apparatus included in the display apparatus according to an embodiment of the disclosure. FIG. 8 illustrates an example in which the display apparatus according to an embodiment converts image data to dimming data.

As shown in FIG. 6, the display apparatus 10 may include a content receiver 80, an image processor 90, a panel driver 30, the liquid crystal panel 20, a dimming driver 170 and the light source apparatus 100.

The content receiver 80 may include a receiving terminal 81 provided to receive a content including a video signal and/or an audio signal from content sources, and a tuner 82.

The receiving terminal 81 may receive a video signal and an audio signal from content sources through a cable. For example, the receiving terminal 81 may include a component (YPbPr/RGB) terminal, a composite (composite video blanking and sync, CVBS) terminal, an audio terminal, a high-definition multimedia interface (HDMI) terminal, and a universal serial bus (USB) terminal.

The tuner 82 may receive a broadcast signal from a broadcast reception antenna or a wired cable. The tuner 82 may extract a broadcast signal of a channel selected by a user from among the broadcast signals. For example, among a plurality of broadcast signals received through the broadcast reception antenna or the wired cable, the tuner 82 may transmit a broadcast signal having a frequency corresponding to a channel selected by a user, and may block a broadcast signal having other frequencies.

As mentioned above, the content receiver 80 may receive a video signal and an audio signal from the content sources through the receiving terminal 81 and/or the tuner 82. The content receiver 80 may output the video signal and/or audio signal received through the receiving terminal 81 and/or the tuner 82 to the image processor 90.

The image processor 90 includes a processor 91 configured to process image data, and a memory 92 configured to memorize/store a program and data for processing image data.

The memory 92 may store programs and data for processing a video signal and/or an audio signal. The memory 92 may temporarily store data generated in processing of a video signal and/or an audio signal.

The memory 92 may include a non-volatile memory such as a Read Only Memory (ROM) and a flash memory, and a volatile memory such as a Static Random Access Memory (S-RAM), and a Dynamic Random Access Memory (D-RAM).

The processor 91 may receive a video signal and/or an audio signal from the content receiver 80. The processor 91 may decode the video signal into image data. The processor 91 may generate dimming data from the image data. In addition, the processor 91 may output image data and dimming data to the panel driver 30 and the dimming driver 170, respectively.

The image processor 90 may generate image data and dimming data based on the video signal obtained by the content receiver 80. Further, the image processor 90 may transmit image data and dimming data to the liquid crystal panel 20 and the light source apparatus 100, respectively.

The image data may include information about an intensity of light transmitted by the plurality of pixels (or a plurality of sub-pixels) included in the liquid crystal panel 20. The image data may be provided to the liquid crystal panel 20 through the panel driver 30.

The liquid crystal panel 20 includes the plurality of pixels configured to transmit or block light, and the plurality of pixels is disposed in a matrix form. In other words, the plurality of pixels may be arranged in a plurality of rows and a plurality of columns.

The panel driver 30 may receive image data from the image processor The panel driver 30 may drive the liquid crystal panel 20 according to the image data. In other words, the panel driver 30 may convert image data that is a digital signal (hereinafter referred to as 'digital image data') to an analog image signal that is an analog voltage signal. The panel driver 30 may provide the analog image signal to the liquid crystal panel 20. Optical properties (for example, light transmittance) of the plurality of pixels included in the liquid crystal panel 20 may vary according to the analog image signal.

The panel driver 30 may include a timing controller, a data driver, and a scan driver.

The timing controller may receive image data from the image processor 90. The timing controller may output image data and a driving control signal to the data driver and the scan driver. The driving control signal may include a scan control signal and a data control signal. The scan control signal and the data control signal may be used to control the operation of the scan driver and the operation of the data driver, respectively.

The scan driver may receive a scan control signal from the timing controller. In response to the scan control signal, the scan driver may activate an input of any one row among a plurality of rows in the liquid crystal panel 20. In other words, the scan driver may convert pixels, which is included in one row among a plurality of pixels arranged in the plurality of rows and the plurality of columns, into a state capable of receiving an analog image signal. In this case, other pixels (other than pixels in which an input is activated by the scan driver) may not receive an analog image signal.

The data driver may receive image data and a data control signal from the timing controller. In response to the data control signal, the data driver may output image data on the liquid crystal panel 20. For example, the data driver may receive digital image data from the timing controller. The data driver may convert digital image data into an analog image signal. In addition, the data driver may provide an analog image signal to pixels that are included in one row and input-activated by the scan driver. At this time, the pixels, for which an input is activated by the scan driver, may receive an analog image signal. Optical properties (for example, light transmittance) of pixels, in which the input is activated, may be changed according to the received analog image signal.

As mentioned above, the panel driver 30 may drive the liquid crystal panel 20 according to image data. Accordingly, an image corresponding to the image data may be displayed on the liquid crystal panel 20.

In addition, the dimming data may include information about an intensity of the light emitted from the plurality of light sources (or the plurality of dimming blocks) included in the light source apparatus 100. The dimming data may be provided to the light source apparatus 100 through the dimming driver 170.

The light source apparatus 100 may include the plurality of light sources 111 configured to emit light. The plurality of light sources 111 is disposed in a matrix form. In other words, the plurality of light sources 111 may be arranged in a plurality of rows and a plurality of columns.

The light source apparatus 100 may be divided into a plurality of dimming blocks 200. In addition, the plurality of dimming blocks 200 may include at least one light source.

The light source apparatus 100 may diffuse light emitted from the plurality of light sources 111, thereby outputting surface light. The liquid crystal panel 20 may include the plurality of pixels, and may control the plurality of pixels to allow the plurality of pixels to transmit or block light. An image may be formed by light that passes through each of the plurality of pixels.

At this time, in order to darken a dark part of an image, the light source apparatus 100 may turn on/off the plurality of light sources corresponding to the dark part of the image. Accordingly, because the dark part of the image is darkened, a contrast ratio of the image may be improved.

As mentioned above, an operation, in which the light source apparatus 100 controls the plurality of light sources 111 to allow the plurality of light sources 111 to emit light in a region corresponding to a bright part of the image and to allow the plurality of light sources 111 not to emit light in a region corresponding to a dark part of the image, is hereinafter referred to as "local dimming".

For the local dimming, the plurality of light sources 111 included in the light source apparatus 100 may be divided into the plurality of dimming blocks 200 as shown in FIG. 7. FIG. 7 illustrates a total of 80 dimming blocks in eight rows and ten columns, but the number and arrangement of dimming blocks are not limited to those shown in FIG. 7.

Each of the plurality of dimming blocks 200 may include at least one light source 111. The light source apparatus 100 may supply the same driving current to light sources 111 included in the same dimming block 200, and the light sources 111 included in the same dimming block 200 may emit light of the same brightness. For example, the light sources 111 included in the same dimming block 200 may be connected in series with each other, and thus the same driving current may be supplied to the light sources 111 included in the same dimming block 200.

In addition, the light source apparatus 100 may further include drive circuits configured to control a driving current supplied to the light sources 111 included in each of the plurality of dimming blocks 200. Each of the drive circuits may be provided to correspond to the dimming blocks 200. In other words, each of the drive circuits may drive the dimming blocks 200.

As mentioned above, because the light sources 111 included in the dimming block 200 are connected in series with each other, the light sources 111 included in the dimming block 200 may operate integrally, and integrally form a light source block.

Hereinafter "supplying a driving current to the dimming block" may represent the same meaning as "supplying a driving current to the light sources included in the dimming block".

FIG. 7 illustrates dimming blocks 200 each including nine light sources 111, but the number and arrangement of light sources 111 included in each of the dimming blocks 200 are not limited to those shown in FIG. 7.

As mentioned above, the image processor 90 may provide dimming data for the local dimming to the light source apparatus 100. The dimming data may include information about a luminance of each the plurality of dimming blocks 200. For example, the dimming data may include information about an intensity of light outputted by the light sources 111 included in each of the plurality of dimming blocks 200.

The image processor 90 may obtain dimming data from image data.

The image processor 90 may convert image data into dimming data in various ways. For example, as shown in FIG. 8, the image processor 90 may divide an image I, based on the image data, into a plurality of image blocks IB. The number of the plurality of image blocks IB may be the same as the number of the plurality of dimming blocks 200, and each of the plurality of image blocks IB may correspond to each of the plurality of dimming blocks 200.

The image processor 90 may obtain a luminance value L of the plurality of dimming blocks 200 from the image data of the plurality of image blocks IB. In addition, the image processor 90 may generate dimming data by combining the luminance values L of the plurality of dimming blocks 200.

For example, the image processor 90 may obtain a luminance value L of each of the plurality of dimming blocks 200 based on a maximum value among luminance values of pixels included in each of the image blocks IB.

One image block may include a plurality of pixels, and image data of the one image block may include image data (for example, red data, green data, blue data, etc.) of the plurality of pixels. The image processor 90 may calculate a luminance value of each of the pixels based on the image data of each of the pixels.

The image processor 90 may determine a maximum value, among the luminance values of each of the pixels included in the image block, as a luminance value of a dimming block corresponding to the image block. For example, the image processor 90 may determine a maximum value, among the luminance values of each of the pixels included in a $i^{th}$ image block IB(i), as a luminance value L (i) of a $i_{th}$ dimming block, and determine a maximum value, among the luminance values of each of the pixels included in a $j^{th}$ image block IB(j), as a luminance value L (j) of a $j^{th}$ dimming block.

The image processor 90 may generate dimming data by combining luminance values of the plurality of dimming blocks 200.

The dimming driver 170 may receive dimming data from the image processor 90. The dimming driver 170 may drive the light source apparatus 100 according to the dimming data. The dimming data may include information about a luminance of each of the plurality of dimming blocks 200 or information about a brightness of the light sources 111 included in the plurality of dimming blocks 200.

The dimming driver 170 may convert dimming data, which is a digital voltage signal, into an analog driving current.

In an active-matrix driving method, the dimming driver 170 may sequentially provide an analog dimming signal to the drive circuits corresponding to the dimming blocks 200.

The plurality of dimming blocks 200 may be divided into a plurality of groups. A driving current may be simultaneously supplied to the dimming blocks included in the same group, and a driving current may be sequentially supplied to the dimming blocks included in different groups, at different times. The dimming driver 170 may activate the dimming blocks 200 included in one of the plurality of groups, and may provide an analog dimming signal to the activated dimming blocks. The dimming driver 170 may activate the dimming blocks 200 included in another group, and may provide an analog dimming signal to the activated dimming blocks.

For example, dimming blocks 200 located in the same row may belong to the same group, and dimming blocks 200 located in different rows may belong to different groups. The dimming driver 170 may activate dimming blocks 200 included in any one row and provide an analog dimming signal to the activated dimming blocks. Thereafter, the dimming driver 170 may activate an input of the dimming blocks 200 included in another row, and provide an analog dimming signal to the dimming blocks 200 in which the input is activated.

The drive circuit of each of the dimming blocks 200 may provide an analog driving current corresponding to an analog dimming signal to the light source module 110. By the analog driving current, the light sources 111 included in the light source module 110 may emit light. The light sources 111 included in the same dimming block 200 may emit the same intensity of light of according to the dimming data. In addition, light sources 111 included in different dimming blocks 200 may emit different intensities of light of according to the dimming data.

A case in which the dimming driver 170 sequentially provides an analog dimming signal to the plurality of dimming blocks 200 in the active-matrix method will be described in more detail.

Figure 9:
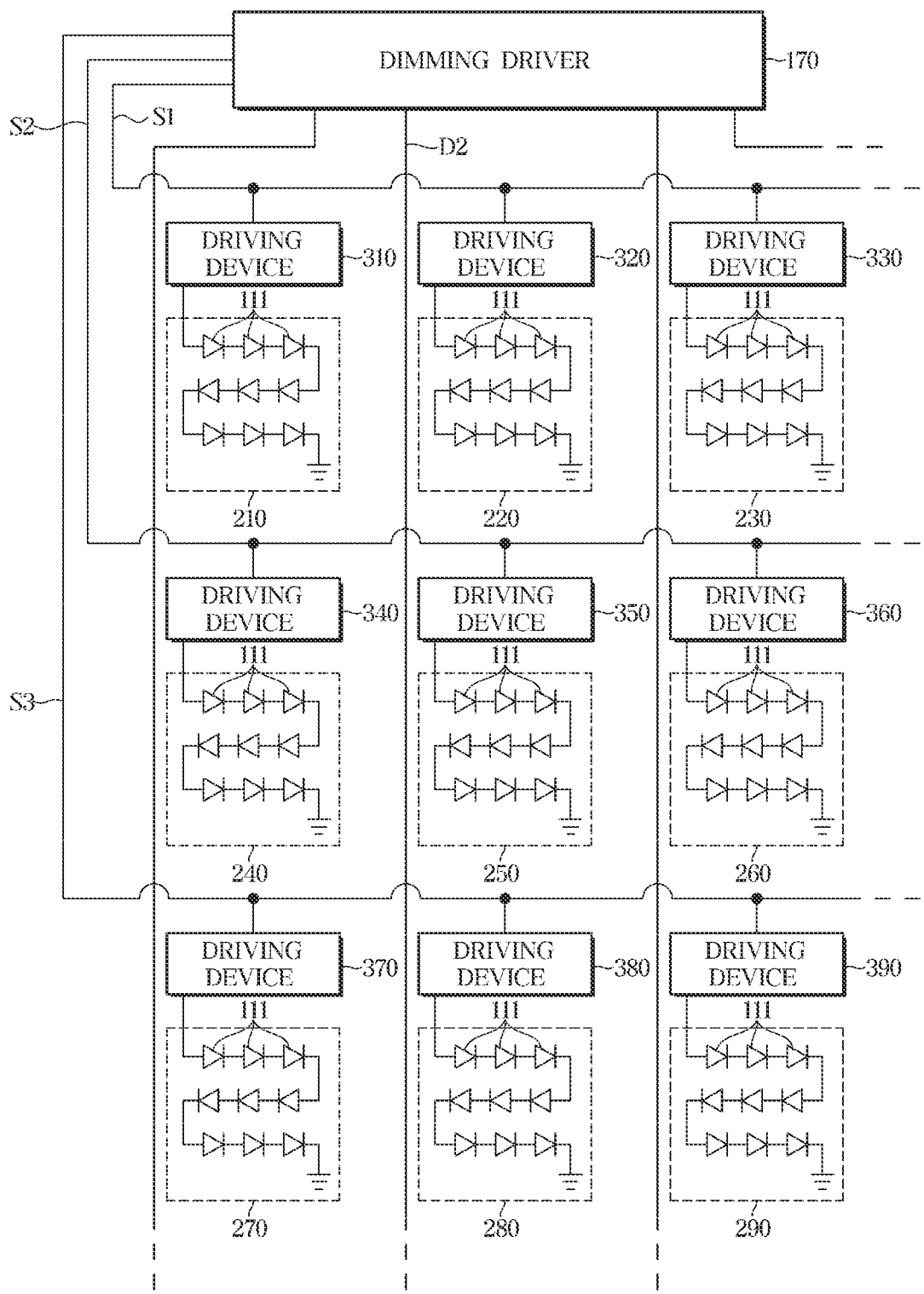
FIG. 9 illustrates an example of a dimming driver and the light source apparatus included in the display apparatus according to an embodiment of the disclosure.
Figure 10:
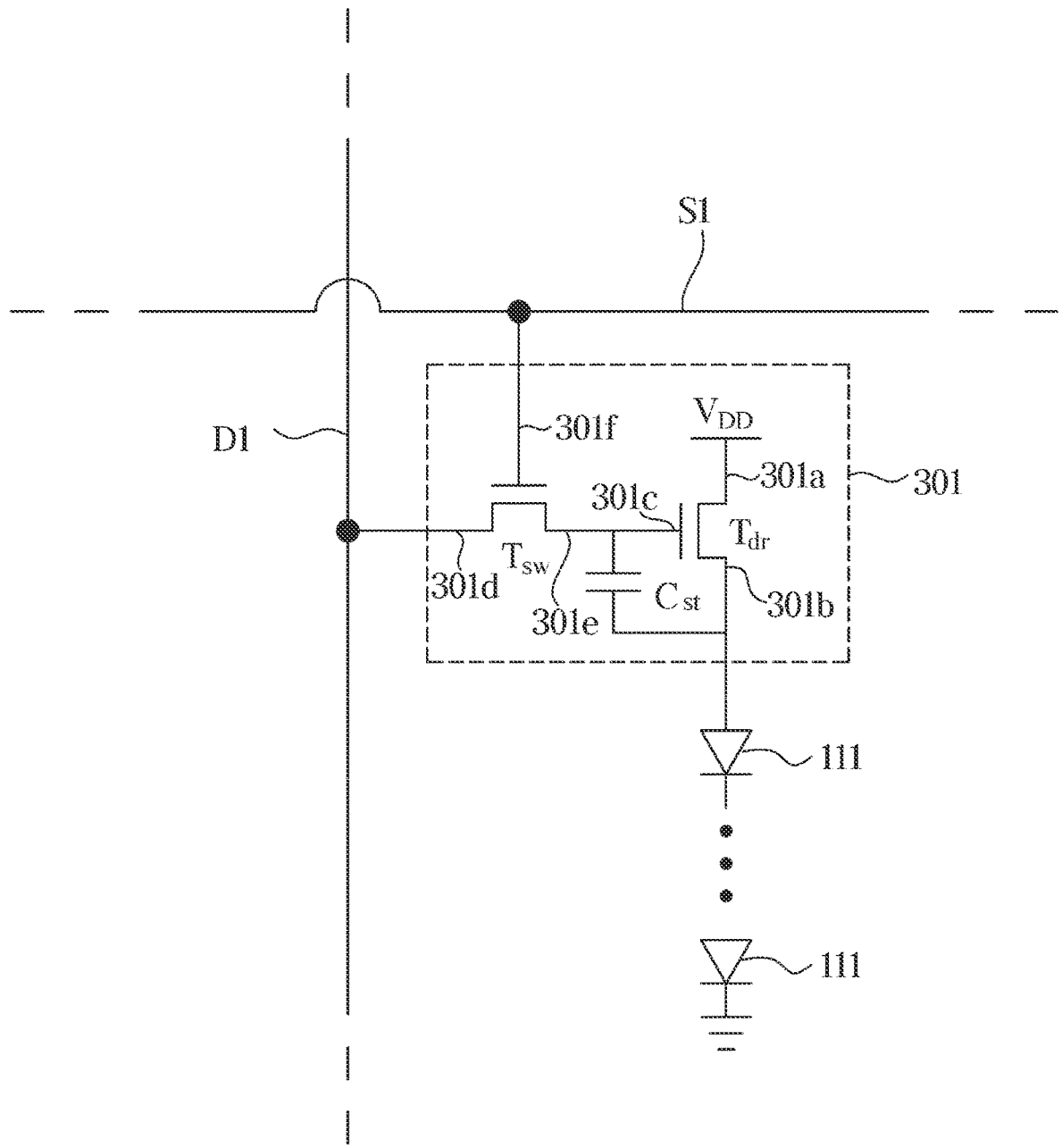
FIG. 10 illustrates an example of a driving device included in the display apparatus according to an embodiment of the disclosure.

FIG. 9 illustrates an example of a dimming driver and the light source apparatus included in the display apparatus according to an embodiment of the disclosure. FIG. 10 illustrates an example of a driving device included in the display apparatus according to an embodiment of the disclosure.

Referring to FIGS. 9 and 10, the display apparatus 10 includes a dimming driver 170, a plurality of driving devices 300 (namely, driving devices 310, 320, 330, 340, 350, 360, 370, 380 and 390), and a plurality of light sources 111.

Each of the plurality of light sources 111 may include a light emitting diode, and may be divided into a plurality of dimming blocks 200 (namely, dimming blocks 210, 220, 230, 240, 250, 260, 270, 280, and 290). For example, light sources 111 included in the same dimming block 200 may be connected in series with each other and supplied with the same driving current.

The plurality of driving devices 300 may receive an analog dimming signal from the dimming driver 170, and supply a driving current to the plurality of light sources 111 in response to the received analog dimming signal.

As illustrated in FIG. 10, a plurality of light sources 111 included in one dimming block 200 may receive a current from the same driving device 300. For example, a plurality of light sources 111 included in a first dimming block 210 may receive a driving current from a first driving device 310. A plurality of light sources 111 included in a second dimming block 220 may receive a driving current from a second driving device 320. A plurality of light sources 111 included in a third dimming block 230 may receive a driving current from a third driving device 330. In the same way, a plurality of light sources 114 included in the nth dimming block 240, 250, 260, 270, 280, and 290 may receive a driving current from the nth driving devices 340, 350, 360, 370, 380 and 390.

While an input is activated by the dimming driver 170, the driving devices 300 may receive an analog dimming signal from the dimming driver 170, and store the received analog dimming signal. While the input is deactivated, the plurality of driving devices 300 may supply a driving current corresponding to the pre-stored analog dimming signal to the plurality of light sources 111.

A plurality of scan lines S1, S2, and S3 configured to provide a scan signal from the dimming driver 170 to the plurality of driving devices 300, and a plurality of data lines D1, D2, and D3 configured to provide an analog dimming signal from the dimming driver 170 to the plurality of driving devices 300 may be provided.

The plurality of dimming blocks 200 may be arranged in a plurality of rows and a plurality of columns. Driving devices 300 corresponding to dimming blocks 200 included in the same row may share the same scan line. For example, the first driving device 310, the second driving device 320, and the third driving device 330 may share a first scan line S1, and the fourth driving device 340, the fifth driving device 350 and the sixth driving device 360 may share a second scan line S2. In addition, the seventh driving device 370, the eighth driving device 380, and the ninth driving device 390 may share a third scan line S3.

In addition, driving devices 300 corresponding to dimming blocks 200 included in the same column may share the same data line. For example, the first driving device 310, the fourth driving device 340, and the seventh driving device 370 may share a first data line D1. The second driving device 320, the fifth driving device 350 and the eighth driving device 380 may share a second data line D2. In addition, the third driving device 330, the sixth driving device 360, and the ninth driving device 390 may share a third data line D3.

The input of the plurality of driving devices 300 may be activated by the scan signal of the dimming driver 170, and the driving devices 300 in which the input is activated may receive the analog dimming signal of the dimming driver 170.

For example, while the dimming driver 170 outputs a scan signal through the first scan line S1, the first driving device 310, the second driving device 320, and the third driving device 330 may receive an analog dimming signal through the first data line D1, the second data line D2 and the third driving device 330, respectively. On the other hand, the other driving devices 340, 350, 360, 370, 380, and 390 do not receive the analog dimming signal.

In addition, while the dimming driver 170 outputs a scan signal through the second scan line S2, the fourth driving device 340, the fifth driving device 350, and the sixth driving device 360 may receive an analog dimming signal through the first data line D1, the second data line D2 and the third driving device 330, respectively. On the other hand, the other driving devices 310, 320, 330, 370, 380, and 390 do not receive the analog dimming signal.

In response to receiving the analog dimming signal, each of the plurality of driving devices 300 may store the received analog dimming signal, and supply a driving current to the plurality of light sources according to the stored analog dimming signal.

For example, while the dimming driver 170 outputs a scan signal through the first scan line S1, the fourth driving device 340, the fifth driving device 350, and the sixth driving device 360 may respectively supply a driving current to the plurality of light sources 111 included in each of the fourth dimming block 240, the fifth dimming block 250, and the sixth dimming block 260.

Further, while the dimming driver 170 outputs a scan signal through the second scan line S2, the first driving device 310, the second driving device 320, and the third driving devices 330 may respectively supply a driving current to the plurality of light sources 111 included in each of the first dimming block 210, the second dimming block 220, and the third dimming block 230.

By the active-matrix driving method, the plurality of driving devices 300 may sequentially receive an analog dimming signal from the dimming driver 170, and even while the input is deactivated (i.e., are in a state in which the plurality of driving devices 300 does not receive an analog dimming signal from the dimming driver 170), the plurality of driving devices 300 may supply a driving current to the plurality of light sources 111.

Further, by performing the active-matrix driving method, the number of pins of the dimming driver 170 for providing an analog dimming signal to the plurality of dimming blocks 200 is reduced. In addition, the number of signal lines for providing an analog dimming signal from the dimming driver 170 to the plurality of dimming blocks 200 is reduced.

Accordingly, the number of dimming blocks 200 may be increased without a limitation in the number of pins of the dimming driver 170.

The plurality of driving devices 300 may include circuits of various topologies to implement the active-matrix driving method.

For example, as shown in FIG. 10, each of the plurality of driving devices 300 may include a one-capacitor two-transistor (1C2T) topology circuit.

Each of the plurality of driving devices 300 may include a drive circuit 301 including a driving transistor Tdr, a switching transistor Tsw, and a storage capacitor Cst.

The driving transistor Tdr includes an input terminal 301a, an output terminal 301b, and a control terminal 301c. The input terminal 301a of the driving transistor Tdr may be connected to a power source Vdd, and the output terminal 301b may be connected to a plurality of light sources 111. The driving transistor Tdr may supply a driving current to the plurality of light sources 111 based on a voltage at the control terminal 301c.

The storage capacitor Cst is provided between the output terminal 301b and the control terminal 301c of the driving transistor Tdr. The storage capacitor Cst may output a constant voltage by storing input charges. The driving transistor Tdr may supply a driving current to the plurality of light sources 111 based on a voltage output by the storage capacitor Cst.

The switching transistor Tsw also includes an input terminal 301d, an output terminal 301e, and a control terminal 301f. The input terminal 301d of the switching transistor Tsw may be connected to the data line D1 or D2, and the output terminal 301e of the switching transistor Tsw may be connected to the control terminal 301c of the driving transistor Tdr. The control terminal 301f of the switching transistor Tsw may be connected to the scan line S1 or S2.

The switching transistor Tsw may be turned on by a scan signal of the scan line S1, S2, or S3 and may transmit an analog dimming signal of the data line D1, D2 or D3 to the storage capacitor Cst and the driving transistor Tdr. The analog dimming signal of the data line data line D1, D2 or D3 may be input to the control terminal 301c of the driving transistor Tdr, and the driving transistor Tdr may supply a driving current corresponding to the analog dimming signal to the plurality of light sources 111. The storage capacitor Cst may store charges from the analog dimming signal, and output a voltage corresponding to the analog dimming signal.

Thereafter, even when the inputting of the scan signal is stopped and the switching transistor Tsw is turned off, the storage capacitor Cst may still output the voltage corresponding to the analog dimming signal, and the driving transistor Tdr may still supply the driving current corresponding to the analog dimming signal to the plurality of light sources 111.

A circuit as shown in FIG. 10 is an example of the driving device 300, but is not limited thereto. For example, the driving device 300 may include a 3T1C topology circuit in which a transistor is added to compensate for body effect of the driving transistor Tdr.

The driving device 300 may be provided in a single chip in which the circuit shown in FIG. 10 is integrated. In other words, the circuit shown in FIG. 10 may be integrated in a single semiconductor chip.

As mentioned above, each of the driving devices 300 may supply a driving current to the light sources 111 included in one dimming block 200. In this case, each of the driving devices 300 may receive a scan signal through one scan line, and receive an analog dimming signal through one data line.

Figure 11:
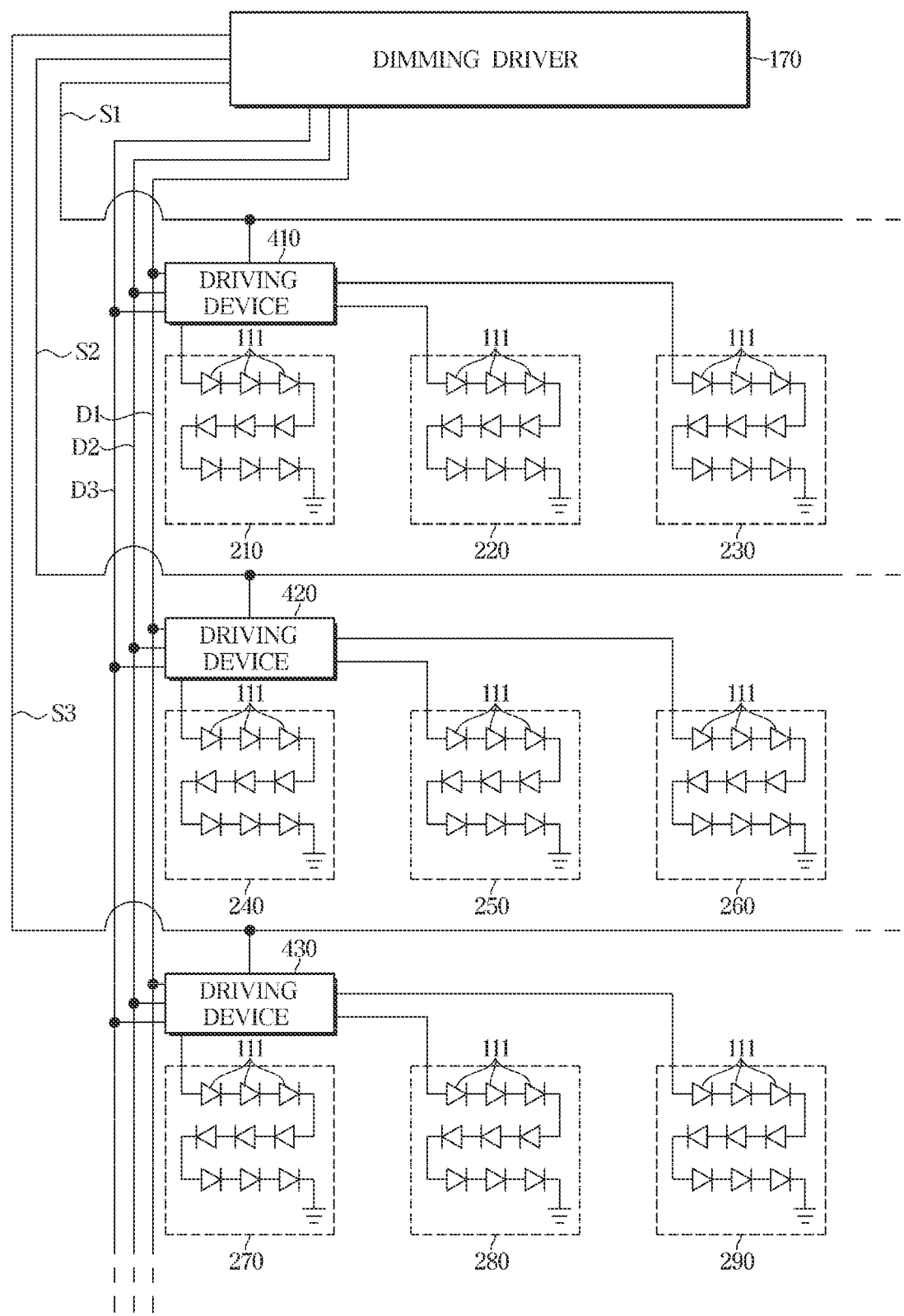
FIG. 11 illustrates an example of the dimming driver and the light source apparatus included in the display apparatus according to an embodiment of the disclosure.
Figure 12:
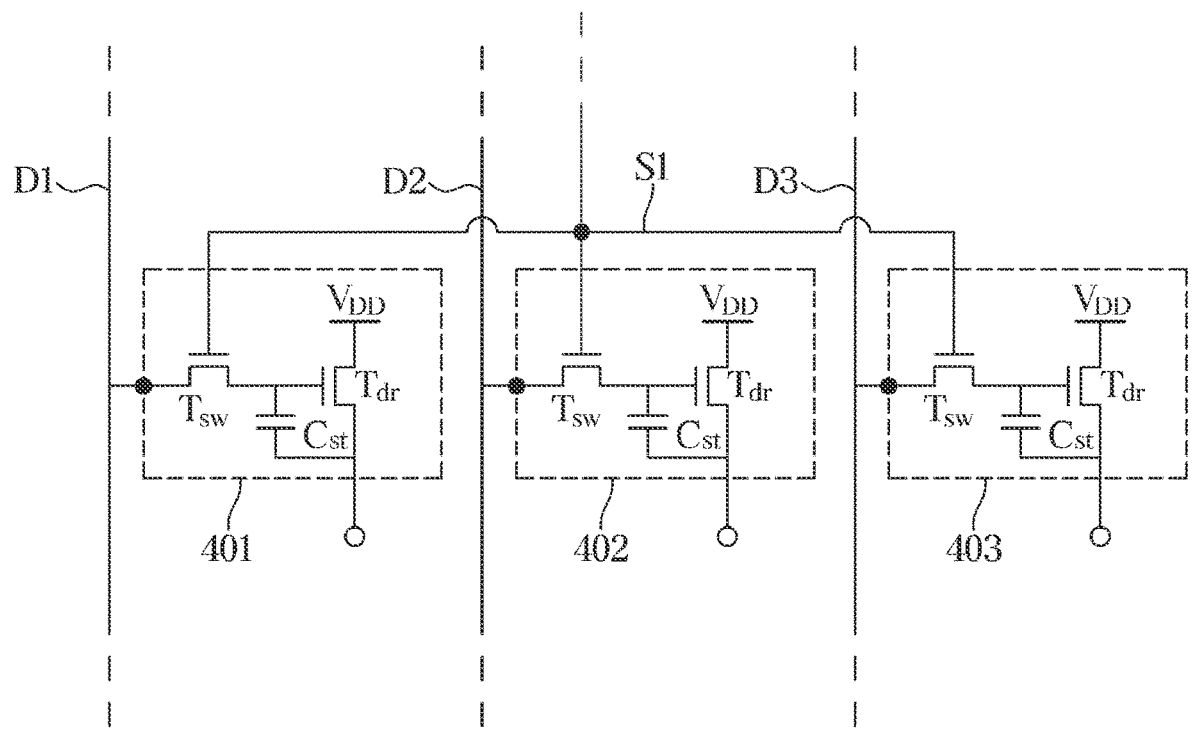
FIG. 12 illustrates an example of the driving device included in the display apparatus according to an embodiment of the disclosure.

FIG. 11 illustrates an example of the dimming driver and the light source apparatus included in the display apparatus according to an embodiment of the disclosure. FIG. 12 illustrates an example of the driving device included in the display apparatus according to an embodiment of the disclosure Referring to FIGS. 11 and 12, the display apparatus 10 includes a dimming driver 170, a plurality of driving devices 400 (namely, driving devices 410, 420, and 430), and a plurality of light sources 111.

The plurality of driving devices 300 may receive an analog dimming signal from the dimming driver 170, and supply a driving current to the plurality of light sources 111 in response to the received analog dimming signal.

The plurality of light sources 111 may include a light emitting diode, and may be divided into a plurality of dimming blocks 200 (namely, dimming blocks 210, 220, 230, 240, 250, 260, 270, 280, and 290). For example, light sources 111 included in the same dimming block 200 may be connected in series with each other and supplied with the same driving current.

As shown in FIG. 11, each of the driving devices 400 may supply a driving current to light sources 111 included in three dimming blocks 200 located in the same row. For example, a first driving device 410 may supply a driving current to a plurality of light sources 111 included in the first dimming block 210, the second dimming block 220, and the third dimming block 230. A second driving device 420 may supply a driving current to a plurality of light sources 111 included in the fourth dimming block 240, the fifth dimming block 250, and the sixth dimming block 260. A third driving device 430 may supply a driving current to a plurality of light sources 111 included in the seventh dimming block 270, the eighth dimming block 280, and the ninth dimming block 290.

The driving devices 400 may supply different driving currents to light sources 111 included in different dimming blocks 200 according to the analog dimming signal. For example, the first driving device 410 may supply a first driving current to the light sources 111 included in the first dimming block 210 according to the analog dimming signal. The second driving device 420 may supply a second driving current to the light sources 111 included in the second dimming block 220 according to the analog dimming signal. The third driving device 430 may supply a third driving current to the light sources 111 included in the third dimming block 230 according to the analog dimming signal.

An input of the driving devices 400 may be activated by a scan signal of the dimming driver 170. While the input is activated, the driving devices 400 may receive an analog dimming signal from the dimming driver 170, store the received analog dimming signal, and supply a driving current corresponding to the received analog dimming signal to the plurality of light sources 111. Further, while the input is deactivated, the driving devices 400 may supply a driving current corresponding to the stored analog dimming signal to the plurality of light sources 111.

For example, when the dimming driver 170 outputs a scan signal through a first scan line S1, an input of the first driving device 410 may be activated. The first driving device 410 may receive and store the analog dimming signal through a first data line D1, a second data line D2 and a third data line D3. According to the received analog dimming signal, the first driving device 410 may supply a driving current to the light sources 111 of the first dimming block 210, the light sources 111 of the second dimming block 220, and the light sources 111 of the third dimming block 230.

Thereafter, when the dimming driver 170 outputs a scan signal through a second scan line S2, an input of the second driving device 420 may be activated. The second driving device 420 may receive and store the analog dimming signal through the first data line D1, the second data line D2 and the third data line D3. According to the received analog dimming signal, the second driving device 420 may supply a driving current to the light sources 111 of the fourth dimming block 240, the light sources 111 of the fifth dimming block 250, and the light sources 111 of the sixth dimming block 260. At this time, the input of the first driving device 410 is deactivated, but the first driving device 410 may supply a driving current to the light sources 111 of the first dimming block 210, the light sources 111 of the second dimming block 220, and the light sources 111 of the third dimming block 230 according to the stored analog dimming signal.

As mentioned above, the first driving device 400 may receive analog dimming signals through the plurality of data lines D1, D2, and D3, and may receive the scan signal through the scan line S1. Based on the reception of the scan signal, the first driving device 400 may supply driving currents to the plurality of dimming blocks 210, 220, and 230 according to the plurality of analog dimming signals.

In order to implement the active-matrix driving method, the plurality of driving devices 400 may include drive circuits 401, 402, and 403 as shown in FIG. 12. In an embodiment, each of the drive circuits 401, 402, and 403 may correspond to each of the dimming blocks.

Each of the plurality of driving devices 400 may include a first drive circuit 401 configured to drive the dimming blocks 210, 240, and 270 at the first column, a second drive circuit 402 configured to drive the dimming blocks 220, 250, and 280 at the second column, and a third drive circuit 403 configured to drive the dimming blocks 230, 260, and 290 at the third column.

Each of the drive circuits 401, 402, and 403 may include a driving transistor Tdr, a switching transistor Tsw, and a storage capacitor Cst. A configuration of each of the drive circuits 401, 402, and 403 may be the same as that of the drive circuit 301 described with reference to FIG. 10.

At this time, the first drive circuit 401, the second drive circuit 402 and the third drive circuit 403 may share a single scan line. Further, the first drive circuit 401, the second drive circuit 402 and the third drive circuit 403 may receive an analog dimming signal from different data lines (for example, data lines D1, D2, and D3 as shown in FIG. 12).

FIG. 12 is only an example of the driving device 400, and thus the disclosure is not limited thereto.

As mentioned above, each of the driving devices 400 may supply a driving current to the plurality of dimming blocks 200 disposed at the same row (or included in the same group). In this case, the driving devices 400 may receive the scan signal through a single scan line and simultaneously receive the plurality of analog dimming signals through the plurality of data lines.

Figure 13:
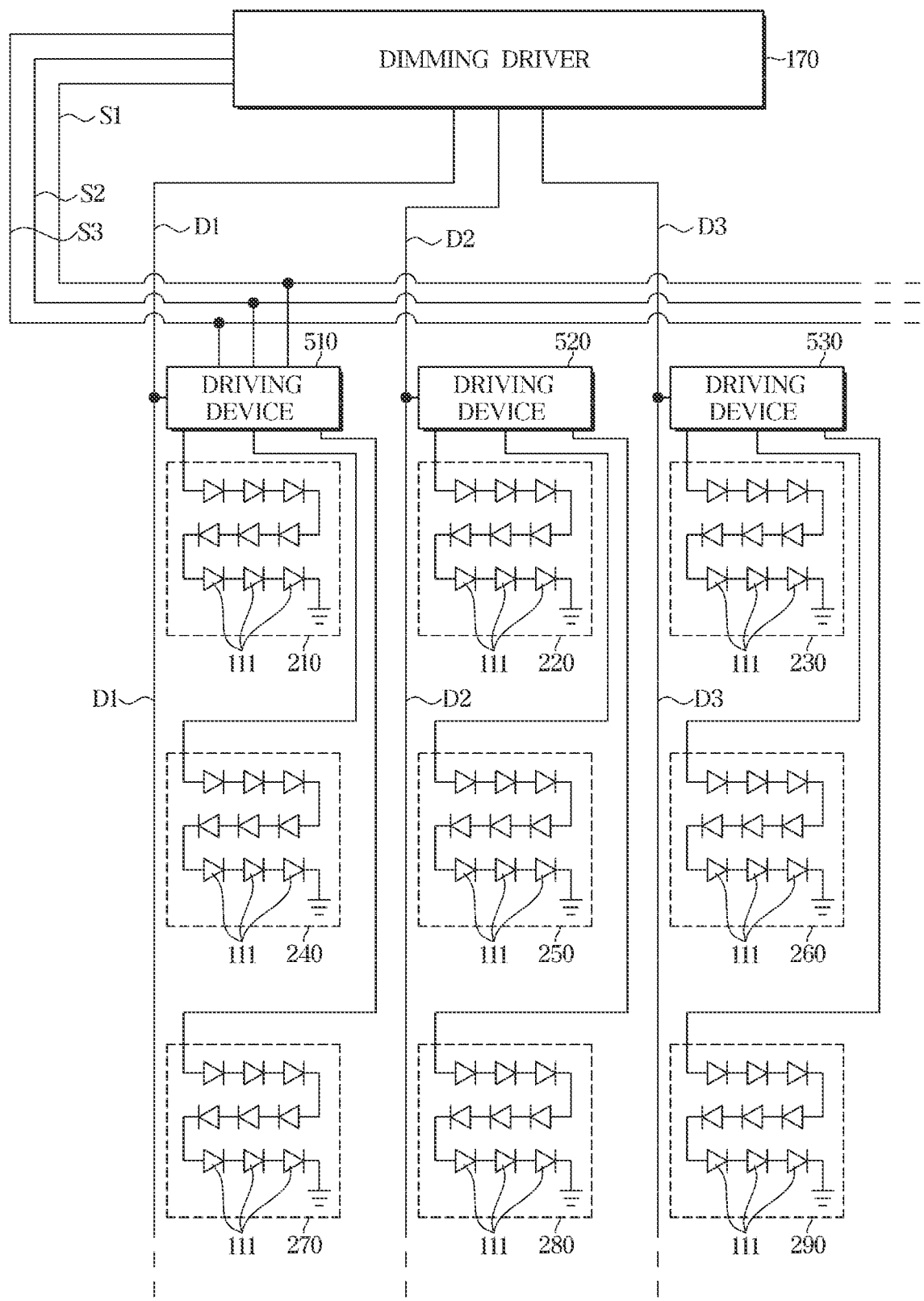
FIG. 13 illustrates an example of the dimming driver and the light source apparatus included in the display apparatus according to an embodiment of the disclosure.
Figure 14:
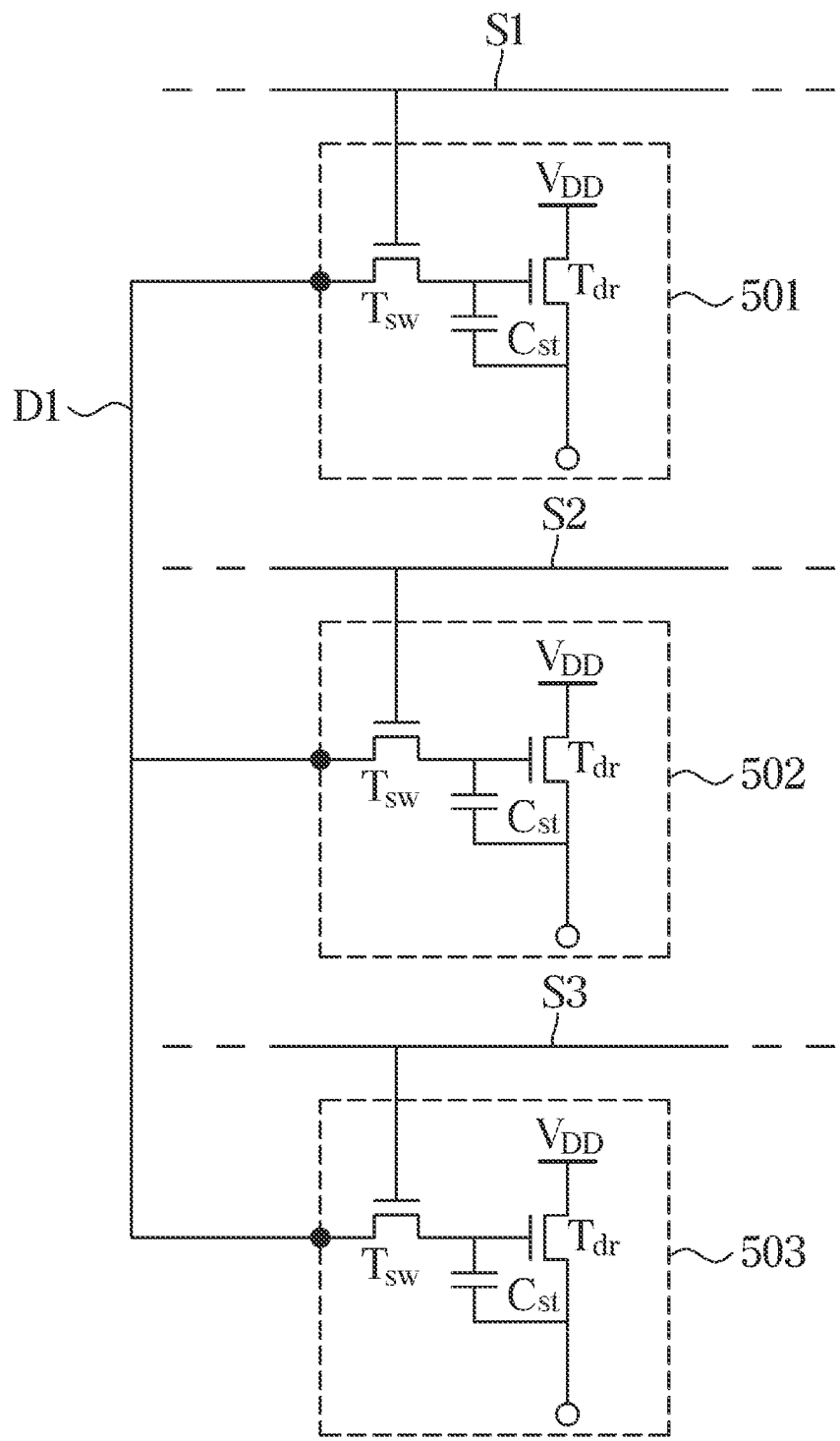
FIG. 14 illustrates an example of the driving device included in the display apparatus according to an embodiment of the disclosure.

FIG. 13 illustrates an example of the dimming driver and the light source apparatus included in the display apparatus according to an embodiment of the disclosure. FIG. 14 illustrates an example of the driving device included in the display apparatus according to an embodiment of the disclosure.

Referring to FIGS. 13 and 14, the display apparatus 10 includes a dimming driver 170, a plurality of driving devices 500 (namely, driving devices 510, 520, and 530), and a plurality of light sources 111.

The plurality of light sources 111 may include a light emitting diode, and may be divided into a plurality of dimming blocks 200 (namely, dimming blocks 210, 220, 230, 240, 250, 260, 270, 280, and 290). For example, light sources 111 included in the same dimming block 200 may be connected in series with each other and supplied with the same driving current.

The plurality of driving devices 500 may receive an analog dimming signal from the dimming driver 170, and supply a driving current to the plurality of light sources 111 in response to the received analog dimming signal.

As shown in FIG. 13, each of the driving devices 500 may supply a driving current to light sources 111 included in three dimming blocks 200 located in the same column. For example, a first driving device 510 may supply a driving current to a plurality of light sources 111 included in the first dimming block 210, the fourth dimming block 240, and the seventh dimming block 270. A second driving device 520 may supply a driving current to a plurality of light sources 111 included in the second dimming block 220, the fifth dimming block 250, and the eighth dimming block 280. A third driving device 530 may supply a driving current to a plurality of light sources 111 included in the third dimming block 230, the sixth dimming block 260, and the ninth dimming block 290.

The driving devices 500 may supply different driving currents to light sources 111 included in different dimming blocks 200 according to the analog dimming signal.

Each of the driving devices 500 may include drive circuits 501, 502, and 503 as shown in FIG. 14. Each of the drive circuits 501, 502, and 503 may correspond to each of the dimming blocks 200, and an input of each of the drive circuits 501, 502, and 503 may be activated by the scan signal of the dimming driver 170. While the input is activated, the drive circuits 501, 502, and 503 may receive an analog dimming signal from the dimming driver 170.

For example, when the dimming driver 170 outputs a scan signal through a first scan line S1, an input of a first drive circuit 501 of the first driving device 510, the second driving device 520 and the third driving device 530 may be activated. The first driving device 510 may receive an analog dimming signal through a first data line D1. The second driving device 520 may receive an analog dimming signal through a second data line D2. The third driving device 530 may receive an analog dimming signal through a third data line D3.

Thereafter, when the dimming driver 170 outputs a scan signal through a second scan line S2, an input of a second drive circuit 502 of the first driving device 510, the second driving device 520 and the third driving device 530 may be activated. The first driving device 510 may receive an analog dimming signal through the first data line D1. The second driving device 520 may receive an analog dimming signal through the second data line D2. The third driving device 530 may receive an analog dimming signal through the third data line D3.

As mentioned above, each of the driving devices 500 may receive scan signals through the plurality of scan lines S1, S2, and S3, and receive the analog dimming signal through the data line D1, D2 or D3. Based on sequentially receiving scan signals, the driving devices 500 may sequentially supply the driving current to the plurality of dimming blocks 200.

In order to implement the active-matrix driving method, the plurality of driving devices 500 may include the drive circuit as shown in FIG. 14.

Each of the plurality of driving devices 500 may include the first drive circuit 501 configured to drive the dimming blocks 210, 220, and 230 at the first row, the second drive circuit 502 configured to drive the dimming blocks 240, 250, and 260 at the second row, and a third drive circuit 503 configured to drive the dimming blocks 270, 280, and 290 at the second row.

Each of the first drive circuit 501, the second drive circuit 502, and the third drive circuit 503 may include a driving transistor Tdr, a switching transistor Tsw, and a storage capacitor Cst. A configuration of each of the first drive circuit 501, the second drive circuit 502, and the third drive circuit 503 may be the same as that of the drive circuit (driving device) described with reference to FIG. 10.

At this time, the first drive circuit 501, the second the drive circuit 502 and the third drive circuit 503 may share a single data line. Further, the input of the first drive circuit 501, the second the drive circuit 502 and the third drive circuit 503 may be activated by a scan signal through different scan lines.

FIG. 14 is only an example of the driving device 500, and thus the disclosure is not limited thereto.

As mentioned above, each of the driving devices 500 may supply a driving current to the plurality of dimming blocks 200 disposed at the same row. In this case, the driving devices 500 may receive the scan signal through the plurality of scan lines and simultaneously receive the plurality of analog dimming signals through a single data line.

In addition, each of the driving devices 500 may supply a driving current to the light sources 111 included in the plurality of dimming blocks 200.

The plurality of dimming blocks 200 may be disposed in a matrix form, and the plurality of dimming blocks 200 may be driven in the active-matrix driving method.

For example, each of the driving devices 500 may supply a driving current to each of the dimming blocks 200 (particularly, light sources 111 included in the dimming block 200) in the active-matrix driving method.

As another example, each of the driving devices 500 may supply a driving current to the plurality of dimming blocks 200 included in the same group (or the same row). In other words, the driving device 500 may include drive circuits (e.g., 501, 502 and 503) configured to supply a driving current to the plurality of dimming blocks 200 included in the same group.

In an embodiment, each of the driving devices may receive a scan signal through a single scan line, and receive a plurality of analog dimming signals through the plurality of data lines. In addition, each of the driving devices may include a single scan pin in contact with the single scan line, and a plurality of data pins respectively connected to the plurality of data lines.

In an embodiment, each of the driving devices may supply a driving current to a plurality of dimming blocks 200 included in different groups (or different rows). In other words, the driving device may include drive circuits configured to supply a driving current to a plurality of dimming blocks 200 included in different groups.

In an embodiment, each of the driving devices may sequentially receive a plurality of scan signals through a plurality of scan lines, and sequentially receive a plurality of analog dimming signals through a single data line. In addition, each of the driving devices may include a plurality of scan pins in contact with the plurality of scan lines and a single data pin connected to a single data line.

Figure 15:
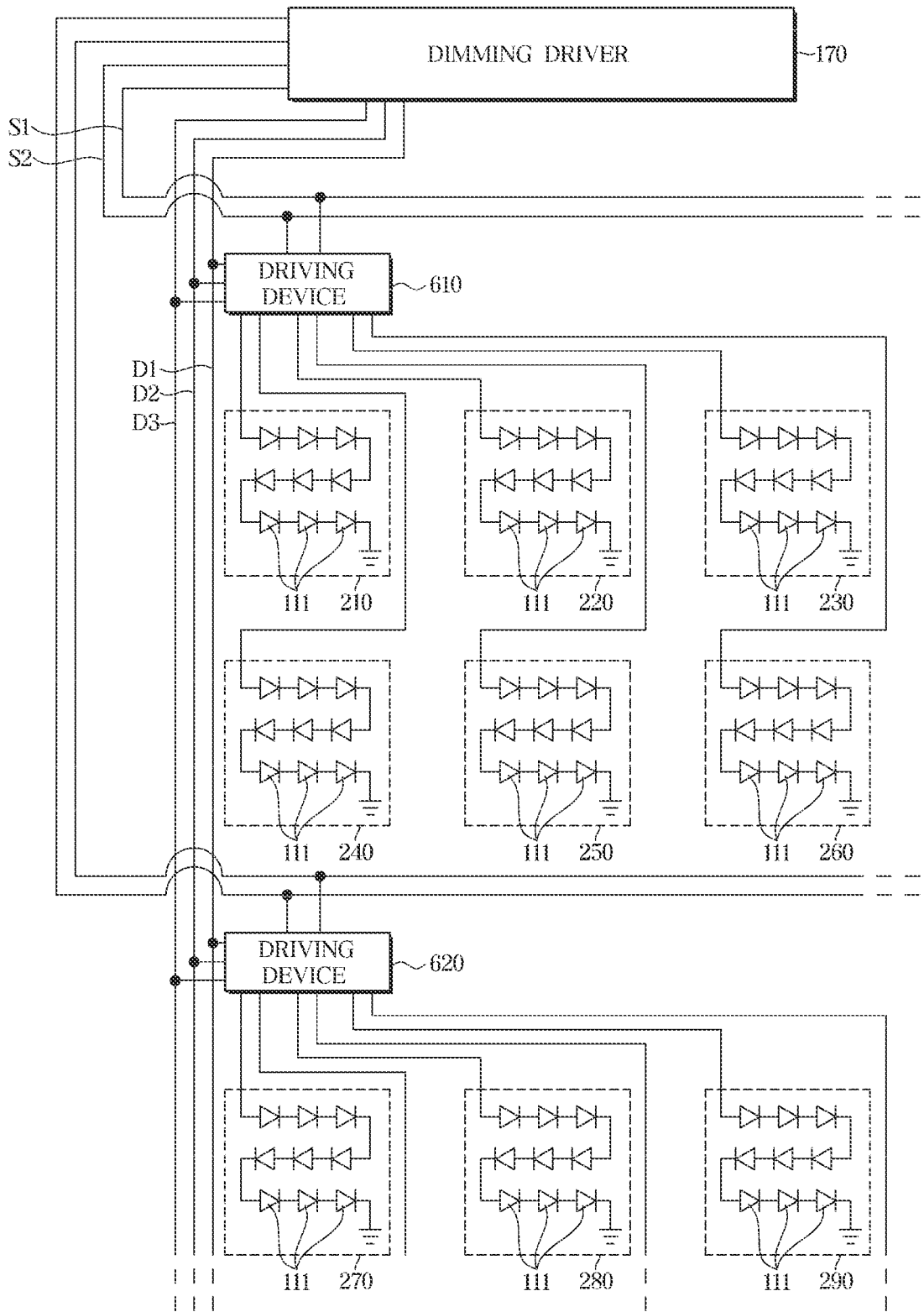
FIG. 15 illustrates an example of the dimming driver and the light source apparatus included in the display apparatus according to an embodiment of the disclosure.

FIG. 15 illustrates an example of the dimming driver and the light source apparatus included in the display apparatus according to an embodiment of the disclosure.

Referring to FIG. 15, the display apparatus 10 includes a dimming driver 170, a plurality of driving devices 600 (namely, driving devices 610 and 620) and a plurality of light sources 111.

The plurality of driving devices 600 may receive an analog dimming signal from the dimming driver 170, and supply a driving current to the plurality of light sources 111 in response to the received analog dimming signal.

The plurality of light sources 111 may include a light emitting diode, and may be divided into a plurality of dimming blocks 200 (namely, dimming blocks 210, 220, 230, 240, 250, 260, 270, 280, and 290). For example, light sources 111 included in the same dimming block 200 may be connected in series with each other and supplied with the same driving current.

As illustrated in FIG. 15, each of the driving devices 600 may supply a driving current to light sources included in six dimming blocks arranged in two rows and three columns (2*3). For example, a first driving device 610 may supply a driving current to light sources included in the first dimming block 210, the second dimming block 220, the third dimming block 230, the fourth dimming block 240, the fifth dimming block 250, and the sixth dimming block 260.

Each of the driving devices 600 may include six drive circuits corresponding to six dimming blocks 200. For example, the first driving device 610 may include a first drive circuit, a second drive circuit, a third drive circuit, a fourth drive circuit, a fifth drive circuit, and a sixth drive circuit respectively corresponding to the first dimming block 210, the second dimming block 220, the third dimming block 230, the fourth dimming block 240, the fifth dimming block 250, and the sixth dimming block 260.

The drive circuits may drive the six dimming blocks, respectively. For example, when the dimming driver 170 outputs a scan signal through a first scan line S1, an input of the first drive circuit, the second drive circuit, and the third drive circuit included in the first driving device 610 may be activated. The input-activated first drive circuit, second drive circuit, and third drive circuit may receive an analog dimming signal through a first data line D1, a second data line D2 and a third data line D3, and supply a driving current to the first dimming block 210, the second dimming block 220, and the third dimming block 230.

When the dimming driver 170 outputs a scan signal through a second scan line S2, an input of the fourth drive circuit, the fifth drive circuit, and the sixth drive circuit included in the first driving device 610 may be activated. The input-activated fourth drive circuit, fifth drive circuit, and sixth drive circuit may receive an analog dimming signal through the first data line D1, the second data line D2 and the third data line D3, and supply a driving current to the fourth dimming block 240, the fifth dimming block 250, and the sixth dimming block 260.

As mentioned above, each of the driving devices 600 may receive a scan signal through the plurality of scan lines S1 and S2 and may receive an analog dimming signal through the plurality of data lines D1, D2 and D3.

The number of scan lines S1 and S2 connected to the driving device 600 may correspond to the number of rows, to which the dimming blocks 200 driven by the driving devices 600 belong. In addition, the number of pins through which the driving device 600 receives the scan signal may correspond to the number of rows to which the dimming blocks 200 driven by the driving devices 600 belong.

The number of data lines D1, D2, and D3 connected to the driving device 600 may correspond to the number of columns to which the dimming blocks 200 driven by the driving devices 600 belong. In addition, the number of pins through which the driving device 600 receives the analog dimming signal may correspond to the number of columns to which the dimming blocks 200 driven by the driving devices 600 belong.

Figure 16:
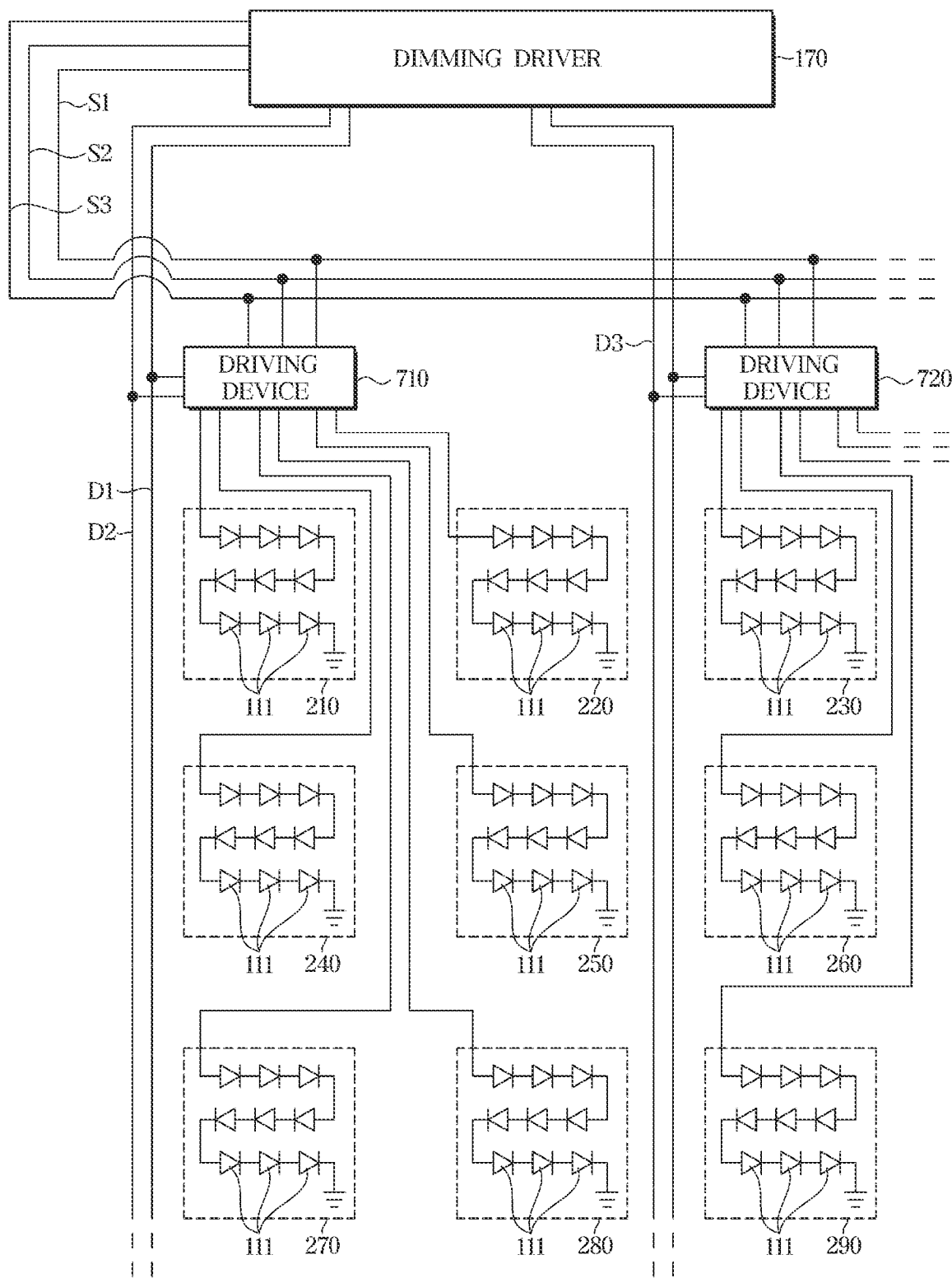
FIG. 16 illustrates an example of the dimming driver and the light source apparatus included in the display apparatus according to an embodiment of the disclosure.

Referring to FIG. 16, the display apparatus 10 includes a dimming driver 170, a plurality of driving devices 700 (namely, driving devices 710 and 720), and a plurality of light sources 111.

The plurality of driving devices 700 may receive an analog dimming signal from the dimming driver 170, and supply a driving current to the plurality of light sources 111 in response to the received analog dimming signal.

The plurality of light sources 111 may include a light emitting diode, and may be divided into a plurality of dimming blocks 200 (namely, dimming blocks 210, 220, 230, 240, 250, 260, 270, 280, and 290). For example, light sources 111 included in the same dimming block 200 may be connected in series with each other and supplied with the same driving current.

As illustrated in FIG. 16, each of the driving devices 700 may supply a driving current to light sources included in six dimming blocks arranged in three rows and two columns (3*2). For example, a first driving device 710 may supply a driving current to light sources included in the first dimming block 210, the second dimming block 220, the fourth dimming block 240, the fifth dimming block 250, the seventh dimming block 270, and the eighth dimming block 280.

Each of the driving devices 700 may include six drive circuits corresponding to six dimming blocks. For example, the first driving device 710 may include a first drive circuit, a second drive circuit, a fourth drive circuit, a fifth drive circuit, a seventh drive circuit, and an eighth drive circuit respectively corresponding to the first dimming block 210, the second dimming block 220, the fourth dimming block 240, the fifth dimming block 250, the seventh dimming block 270, and the eighth dimming block 280.

The drive circuits may drive the six dimming blocks, respectively. For example, when the dimming driver 170 outputs a scan signal through a first scan line S1, an input of the first drive circuit and the second drive circuit included in the first driving device 710 may be activated. The input-activated first drive circuit and second drive circuit may receive an analog dimming signal through a first data line D1 and a second data line D2, and supply a driving current to the first dimming block 210 and the second dimming block 220.

When the dimming driver 170 outputs a scan signal through a second scan line S2, an input of the fourth drive circuit and the fifth drive circuit included in the first driving device 710 may be activated. The input-activated fourth drive circuit and fifth drive circuit may receive an analog dimming signal through the first data line D1 and the second data line D2 and supply a driving current to the fourth dimming block 240 and the fifth dimming block 250.

When the dimming driver 170 outputs a scan signal through a third scan line S3, an input of the seventh drive circuit and the eighth drive circuit included in the first driving device 710 may be activated. The input-activated seventh drive circuit and eighth drive circuit may receive an analog dimming signal through the first data line D1 and the second data line D2 and supply a driving current to the seventh dimming block 270 and the eighth dimming block 280.

As mentioned above, each of the driving devices 700 may receive a scan signal through the plurality of scan lines S1, S2 and S3 and may receive an analog dimming signal through the plurality of data lines D1 and D2.

The number of scan lines S1, S2 and S3 connected to the driving device 700 may correspond to the number of rows, to which the dimming blocks 200 driven by the driving devices 700 belong. In addition, the number of pins through which the driving device 700 receives the scan signal may correspond to the number of rows to which the dimming blocks 200 driven by the driving devices 700 belong.

The number of data lines D1 and D2 connected to the driving device 700 may correspond to the number of columns to which the dimming blocks 200 driven by the driving devices 700 belong. In addition, the number of pins through which the driving device 700 receives the analog dimming signal may correspond to the number of columns to which the dimming blocks 200 driven by the driving devices 700 belong.

As illustrated in FIGS. 15 and 16, even when the driving device drives the same number of dimming blocks, the number of scan signals and the number of analog dimming signals received by the driving device may be different according to the arrangement of the driven dimming blocks. Therefore, the driving device 600 shown in FIG. 15 is different from the driving device 700 shown in FIG. 16.

As mentioned above, the driving device may supply a driving current to the light sources 111 included in the plurality of dimming blocks. In this case, the dimming blocks to which the driving current is supplied by the same driving device may form a "driving region" on the substrate. In other words, the driving region may indicate a region occupied by a plurality of dimming blocks 200, which is driven by a single driving device, in the light source apparatus 100 or the display apparatus 10.

Figure 17:
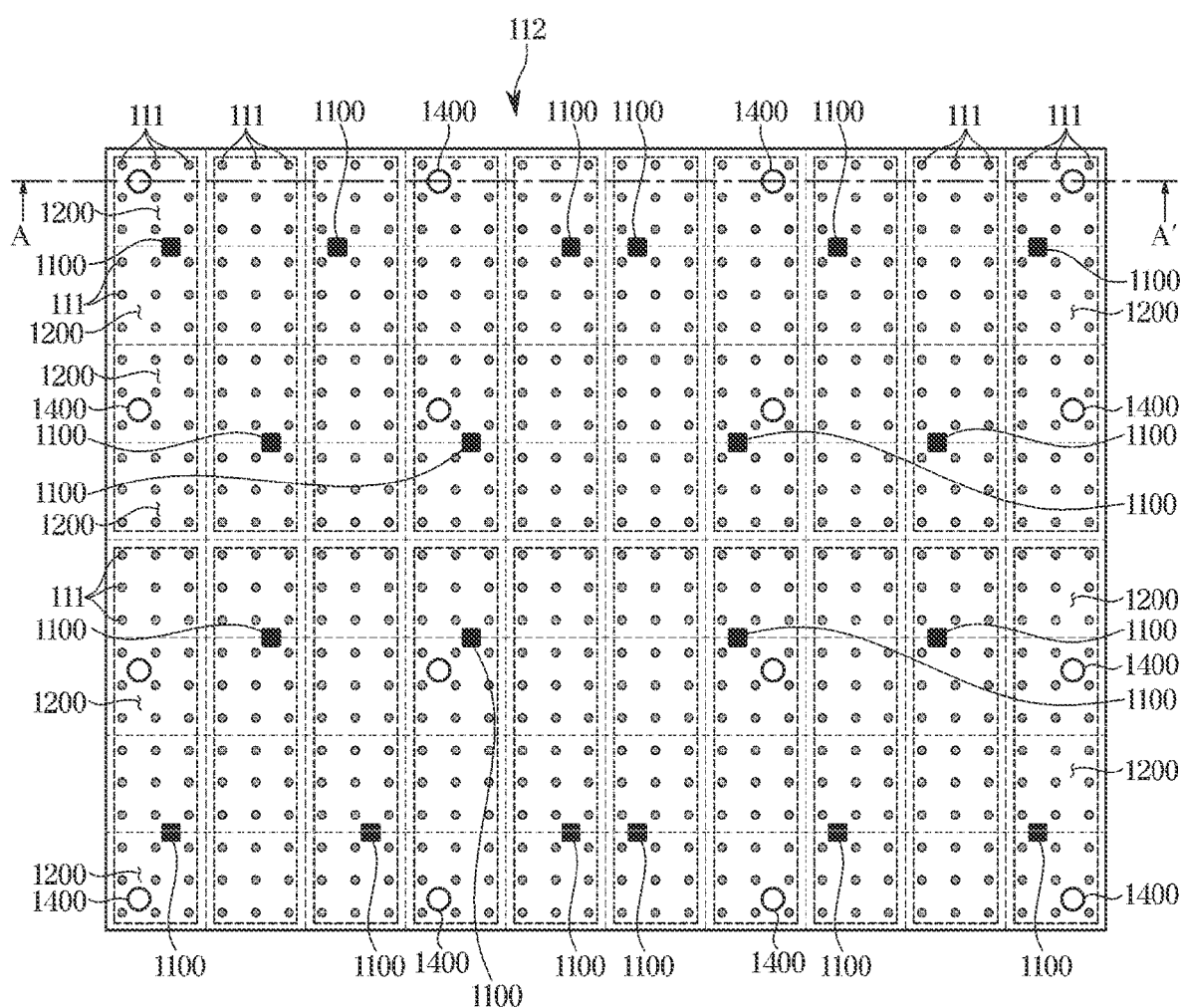
FIG. 17 illustrates an example of a first surface of a substrate included in the display apparatus according to an embodiment of the disclosure.
Figure 18:
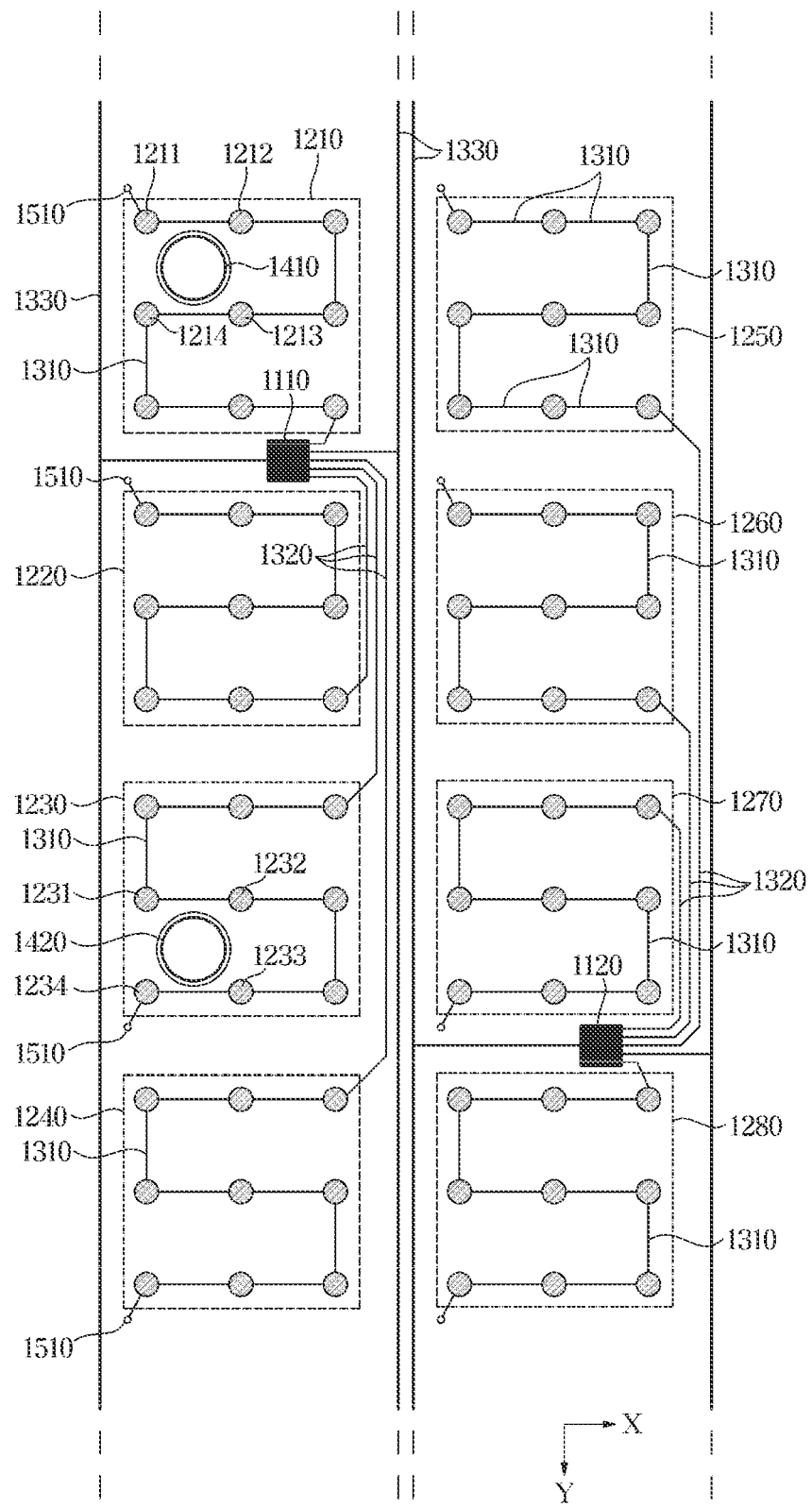
FIG. 18 illustrates a portion of the substrate shown in FIG. 17.
Figure 19:
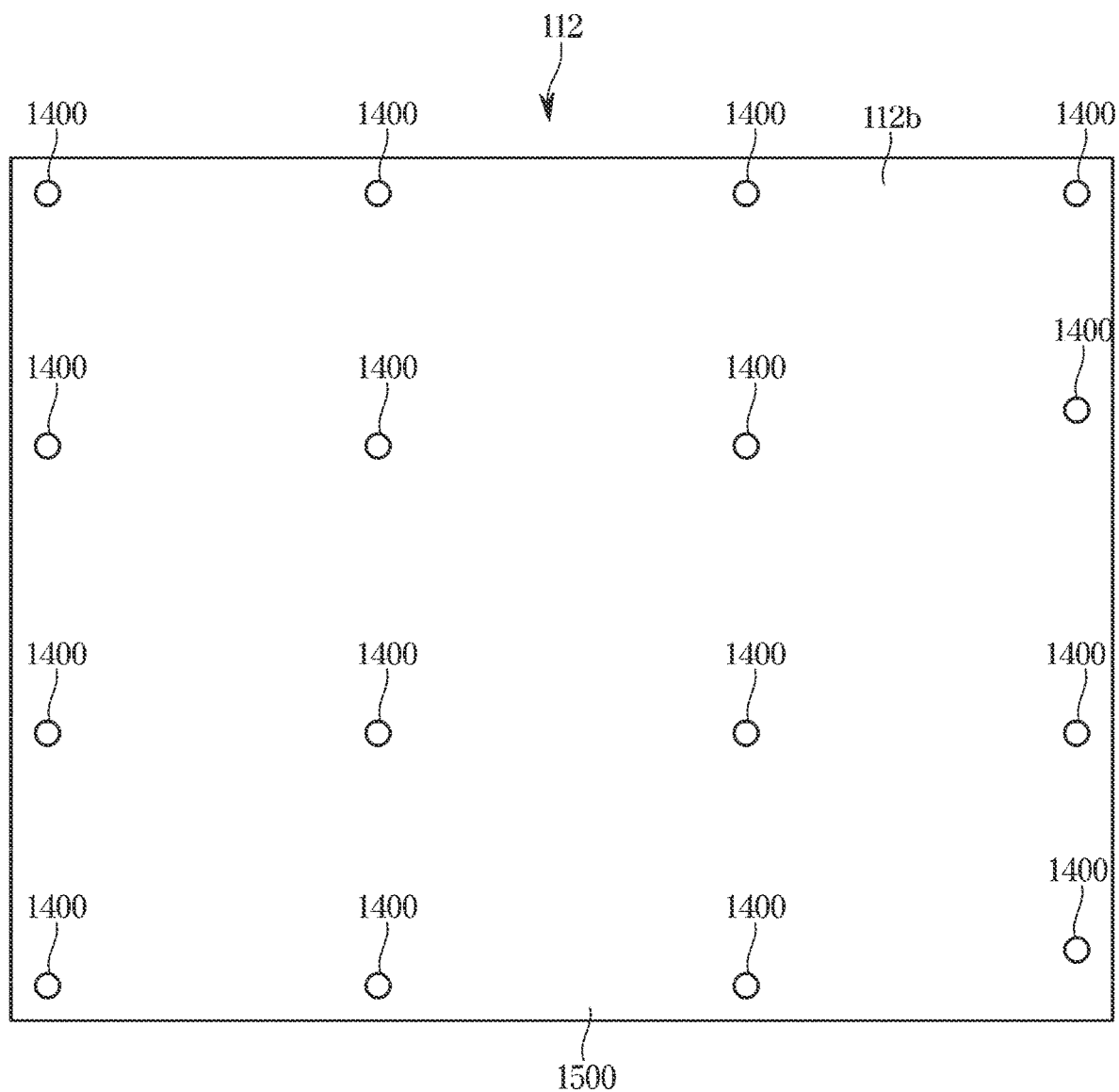
FIG. 19 illustrates an example of a second surface of the substrate included in the display apparatus according to an embodiment of the disclosure.
Figure 20:
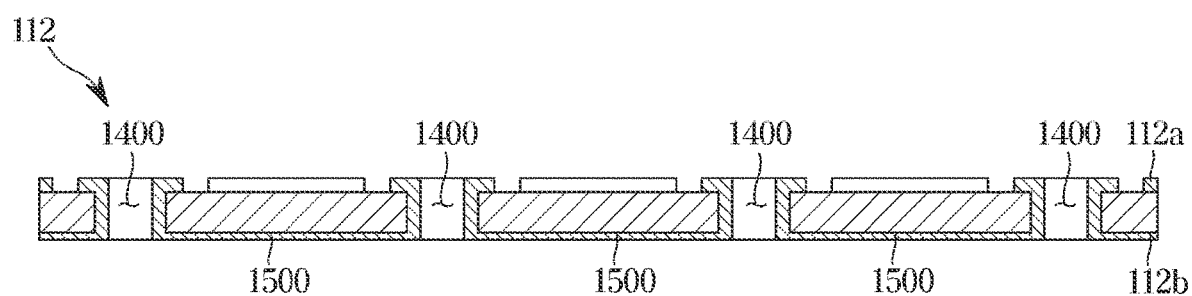
FIG. 20 illustrates a cross section in a direction A-A' shown in FIG. 17.

FIG. 17 illustrates an example of a first surface of a substrate included in the display apparatus according to an embodiment of the disclosure. FIG. 18 illustrates a portion of the substrate shown in FIG. 17. FIG. 19 illustrates an example of a second surface of the substrate included in the display apparatus according to an embodiment of the disclosure. FIG. 20 illustrates a cross section in a direction A-A' shown in FIG. 17.

Referring to FIGS. 17, 18, 19 and 20, the plurality of light sources 111 configured to emit monochromatic light (for example, blue light), and a plurality of driving devices 1100 configured to control a driving current supplied to each of the plurality of light sources 111 may be provided on a first surface 112a on the substrate 112.

The plurality of light sources 111 may include light sources connected in series with each other, and the light sources connected in series with each other may form a dimming block 1200. For example, nine light sources connected in series with each other may form a dimming block as shown in FIG. 17. In other words, the plurality of light sources 111 provided on the substrate 112 may be divided into the plurality of dimming blocks 1200.

Each of the plurality of driving devices 1100 may drive the dimming blocks 1200. Particularly, each of the plurality of driving devices 1100 may control a driving current supplied to the dimming blocks 1200. For example, a first driving device 1110 may drive light sources of a first dimming block 1210, a second dimming block 1220, a third dimming block 1230, and a fourth dimming block 1240. The first dimming block 1210, the second dimming block 1220, the third dimming block 1230, and the fourth dimming block 1240 may be arranged in four rows and one column. A second driving device 1120 may drive light sources of a fifth dimming block 1250, a sixth dimming block 1260, a seventh dimming block 1270, and an eighth dimming block 1280. The fifth dimming block 1250, the sixth dimming block 1260, the seventh dimming block 1270, and the eighth dimming block 1280 may be arranged in four rows and one column.

Electrically conductive lines 1310, 1320, and 1330 through which a driving current flows may be provided on the first surface 112a of the substrate 112. For example, the electrically conductive lines 1310, 1320, and 1330 formed on the first surface 112a may include first lines 1310 connecting between the light sources 111 to allow a driving current to be supplied to each of the light sources 111, second lines 1320 connecting the driving devices 1100 to the light sources 111 to allow a driving current to be supplied to the light sources 111 of each of the dimming blocks 1200 from the driving devices 1100, and third lines 1330 connecting the dimming driver 170 to the driving devices 1100 to allow a dimming signal to be transmitted to the driving devices 1100.

The first lines 1310 may connect the light sources 111, forming each of the dimming blocks 1200, in series with each other. The light sources 111 forming each of the dimming blocks 1200 may be arranged in rows and columns so as to be arranged in the form of a matrix. For example, nine light sources 111 forming a single dimming block may be arranged in three rows and three columns, as shown in FIG. 18. The nine light sources 111 may be connected in series through eight first lines 1310. The eight first lines 1310 may connect nine light sources 111 to each other in the form of a zigzag or the English letter "S" or the number "2".

The light sources 111 forming each of the dimming blocks 1200 may be connected in different patterns through the first lines 1310. For example, as illustrated in FIG. 18, the light sources forming each of the first dimming block 1210 and the second dimming block 1220 may be connected in a first pattern (the English letter "S") by the first lines. The light sources forming each of the third dimming block 1230 and the fourth dimming block 1240 may be connected in a second pattern (the number "2") by the first lines.

As mentioned above, the first lines 1310 may electrically connect the light sources 111 to each other in the dimming blocks 1200.

Each of the second lines 1320 may connect the driving devices 1100 to the dimming blocks 1200. The second lines 1320 may be disposed between the dimming blocks 1210, 1220, 1230, and 1240 driven by the first driving device 1110, and the dimming blocks 1250, 1260, 1270, and 1280 driven by the second driving device 1120. In other words, the second lines 1320 may be disposed between a first driving region including the light sources driven by the first driving device 1110 and a second driving region including the light sources driven by the second driving device 1120.

The second lines 1320 may extend from the driving devices 1100 toward the dimming blocks 1200 in a specific direction. For example, the first dimming block 1210, the second dimming block 1220, the third dimming block 1230, and the fourth dimming block 1240 connected to the first driving device 1110 may be disposed in a straight line in a y-axis direction, as illustrated in FIG. 18. The second lines 1320 may extend to the first dimming block 1210, the second dimming block 1220, the third dimming block 1230, and the fourth dimming block 1240 from the first driving device 1110 in the y-axis direction.

As mentioned above, between the dimming blocks 1200, the second lines 1320 may extend in a predetermined direction (for example, the y-axis direction shown in FIG. 18).

The third lines 1330 may extend from the dimming driver 170 to the driving devices 1100 to transmit the scan signal and the dimming signal of the dimming driver 170 to the driving devices 1100.

As shown in FIG. 18, the third lines 1330 may be disposed between the dimming blocks 1200, and may extend in the same direction as a direction in which the second lines 1320 extend.

As mentioned above, the second lines 1320 and the third lines 1330 for driving and controlling the light sources 111 may be disposed between the dimming blocks 1200 and particularly, between the driving regions, and may extend in the predetermined direction (for example, the y-axis direction shown in FIG. 18). The first lines 1310 connecting the light sources 111 to each other may be disposed between the light sources in the dimming block.

As described above, various electrical components for emitting light (for example, light sources, driving devices, electrically conductive lines, etc.) may be disposed on the first surface 112*a* of the substrate 112.

On the other hand, an electrically conductive ground plate 1500 only connected to a ground of the display apparatus 10 may be provided on a second surface 112*b* of the substrate 112. For example, a pattern (for example, a line) for driving and controlling the light sources 111 may not be formed on the electrically conductive ground plate 1500 disposed on the second surface 112*b* of the substrate 112, as illustrated in FIG. 19.

Therefore, in a process of manufacturing the substrate 112, a mask for forming a pattern on the second surface 112*b* of the substrate 112 may not be required, and an etching process for forming a pattern on the second surface 112*b* may not be required. Accordingly, it is possible to simplify the process of manufacturing the substrate 112 and to reduce a cost for manufacturing the substrate 112.

A plurality of holes 1400 may be formed on the substrate 112. As shown in FIG. 20, each of the plurality of holes 1400 may extend from the first surface 112*a* to the second surface 112*b* of the substrate 112 by penetrating the substrate 112. Each of the plurality of holes 1400 may be larger than a via 1510.

The holes 1400 of the substrate 112 may be used in various manners.

The holes 1400 of the substrate 112 may be used to fix the substrate 112 in a process of mounting the light sources 111 and the driving devices 1100 to the substrate 112.

For example, the light sources 111 and the driving devices 1100 may be mounted to the substrate 112 through the surface mount technology (SMT). The substrate 112 may be fixed to a carrier jig to prevent the movement of the substrate 112 in the process of mounting the light sources 111 and the driving devices 1100 to the substrate 112.

The carrier jig may include a fixing protrusion or a fixing pin for fixing the substrate 112. The fixing protrusion or fixing pin of the carrier jig may be inserted into the holes 1400 formed in the substrate 112 to fix the substrate 112. In a state in which the fixing protrusion or fixing pin of the carrier jig is inserted into the holes 1400, and the substrate 112 is fixed to the carrier jig, the light sources 111 and the driving devices 1100 may be mounted on the substrate 112 by heat and pressure.

The holes 1400 may be approximately uniformly disposed on the substrate 112 so as to disperse heat and pressure that is applied to the light sources 111 and the driving devices 1100 to mount the light sources 111 and the driving devices 1100 to the substrate 112.

The holes 1400 of the substrate 112 may be used as via holes.

Through the first lines 1310, the light sources 111 may be connected in series between the output terminals of the driving devices 1100 and the ground. For example, among the nine light sources shown in FIG. 18, a light source at a first end may be electrically connected to the driving device through the second line. In addition, among the nine light sources shown in FIG. 18, a light source at a second end may be electrically connected to the ground. Particularly, among the nine light sources shown in FIG. 18, the light source at the second end may be electrically connected to the ground plate 1500 of the second surface 112*b* through the via 1510 penetrating the substrate 112. Each of the vias 1510 may extend from the first surface 112*a* to the second surface 112*b* of the substrate 112 by penetrating the substrate 112.

In addition, various ground patterns may be provided on the first surface 112*a* of the substrate 112. The ground patterns provided on the first surface 112*a* may protect circuits of the substrate 112 from electromagnetic interference (EMI) generated from the control assembly 50 and/or the power assembly 60, and the ground patterns may secure electromagnetic compatibility (EMC). In addition, the ground plate 1500 that is also connected to the ground of the display apparatus 10 may be provided on the second surface 112*b* of the substrate 112.

In order to connect the ground patterns provided on the first surface 112*a* to the ground of the display apparatus, the ground plate 1500 of the second surface 112*b* may be electrically connected to ground patterns provided on the first surface 112*a* through the vias 1510 and/or the holes 1400.

In order to electrically connect the ground plate 1500 of the second surface 112*b* to the ground patterns provided on the first surface 112*a*, an electrically conductive material (for example, metal film) may be applied to an inside of the holes 1400, as illustrated in FIG. 20. In other words, the holes 1400 formed in the substrate 112 may be used as via holes.

Due to electric charges accumulated in the ground plate 1500, a potential of the ground plate 1500 may be changed. Accordingly, the light sources 111 and/or the driving devices 1100 may malfunction or the light sources 111 and/or the driving devices 1100 may be damaged due to a large inrush current flowing into the light sources 111 and/or the driving devices 1100.

The holes 1400 may be approximately uniformly disposed on the substrate 112 to allow the ground plate 1500 to maintain a uniform electric potential.

A diameter of each of the holes 1400 may be slightly less than a distance between the light sources 111, but the holes 1400 may interfere with the arrangement of electrically conductive lines. Therefore, the holes 1400 may be disposed so as not to interfere with the arrangement of the electrically conductive lines 1310, 1320, and 1330.

The first lines 1310 may connect the light sources 111 to each other in series in the dimming block 1200, and the second lines 1320 and/or the third lines 1330 may be disposed between the dimming blocks 1200.

Each of the holes 1400 may be disposed inside the dimming blocks 1200 so as not to interfere with the arrangement of electrically conductive lines 1310, 1320, and 1330.

As shown in FIG. 18, the light sources 111 may be arranged in rows and columns so as to be arranged in the form of a matrix, and the first lines 1310 may be disposed in the form of the English letter "S" or the number "2" along the light sources 111. Accordingly, a region, in which the first lines 1310 are not disposed, exists between the light sources 111.

For example, the electrically conductive line is not disposed in a region surrounded by the four light sources 1211, 1212, 1213, and 1214 adjacent to each other in the first dimming block 1210. Accordingly, the first hole 1410, which is disposed in the region surrounded by the four light sources 1211, 1212, 1213, and 1214 adjacent to each other in the first dimming block 1210, may not interfere with the arrangement of the first lines 1310.

On the other hand, the second lines 1320 and/or third lines 1330 may be disposed in a region between the dimming blocks 1200. Particularly, the second lines 1320 extending from the first driving device 1110 to the dimming blocks 1210, 1220, 1230, and 1240, and the second lines 1320 extending from the dimming driver 170 to the first driving device 1110 may be disposed between the diming blocks 1210, 1220, 1230, and 1240 driven by the first driving device 1110, and the dimming blocks 1250, 1260, 1270, 1280 driven by the second driving device 1120. When the first hole 1410 is disposed between the diming blocks 1210, 1220, 1230, and 1240, and the dimming blocks 1250, 1260, 1270, and 1280, the first hole 1410 may interfere with the arrangement of the second lines 1320 and/or the third lines 1330.

As mentioned above, the holes 1400 may be disposed in the dimming blocks 1200 so as not to interfere with the arrangement of second lines 1320 and/or the third lines 1330. Particularly, the holes 1400 may be provided in a substantially rectangular region surrounded by four light sources adjacent to each other. Four light sources may be light sources in one dimming block, and connected in series with each other.

Figure 21:
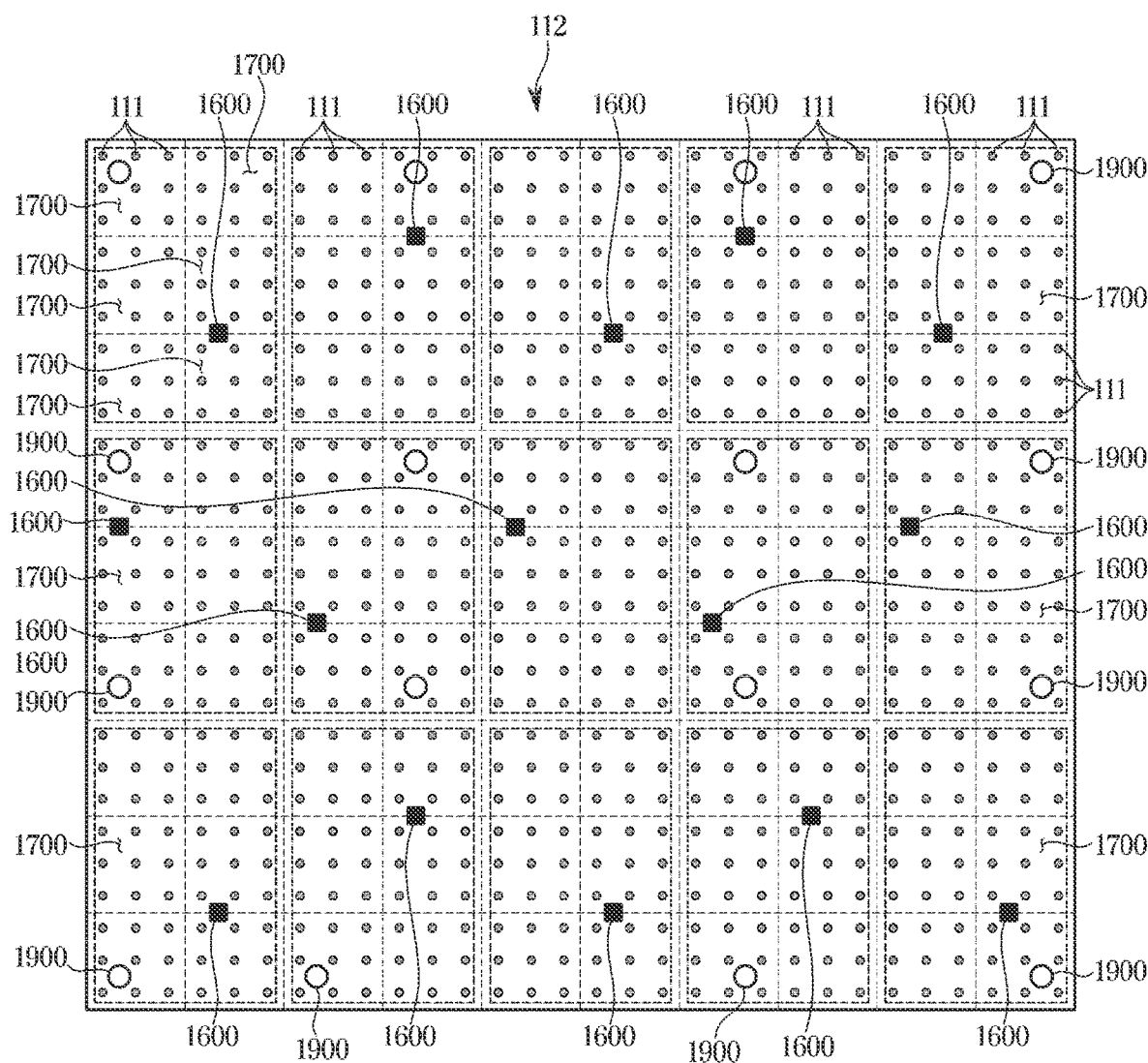
FIG. 21 illustrates an example of the first surface of the substrate included in the display apparatus according to an embodiment of the disclosure.
Figure 22:
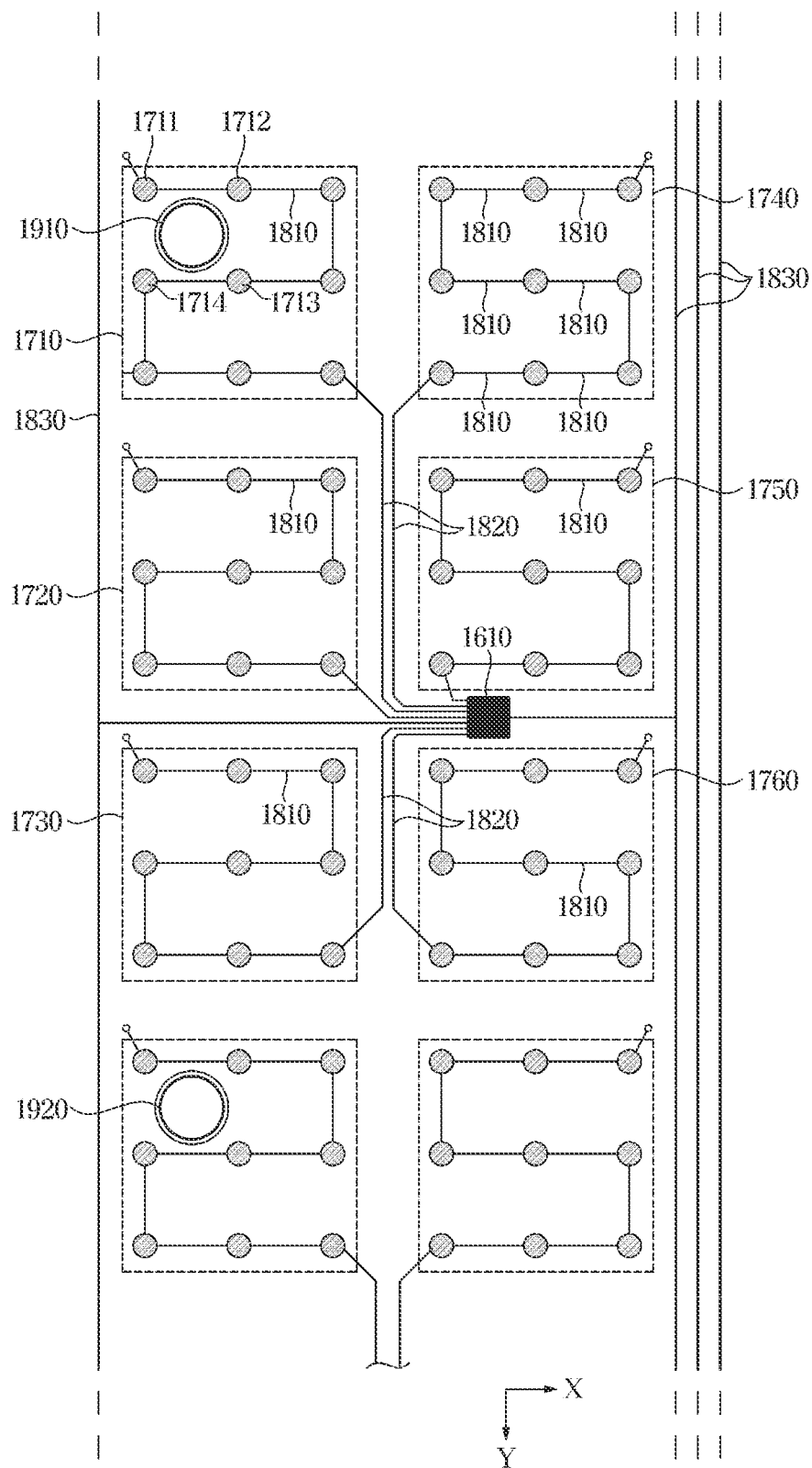
FIG. 22 illustrates a portion of the substrate shown in FIG. 21.

FIG. 21 illustrates an example of the first surface of the substrate included in the display apparatus according to an embodiment of the disclosure. FIG. 22 illustrates a portion of the substrate shown in FIG. 21.

Referring to FIGS. 21 and 22, the plurality of light sources 111 configured to emit monochromatic light (for example, blue light), and a plurality of driving devices 1600 configured to control a driving current supplied to each of the plurality of light sources 111 may be provided on a first surface 112a on the substrate 112.

The plurality of light sources 111 may include light sources 111 connected in series with each other, and the light sources 111 connected in series with each other may form a dimming block 1700, as illustrated in FIG. 21.

Each of the plurality of driving devices 1600 may drive the dimming blocks 1700. Particularly, each of the plurality of driving devices 1600 may control a driving current supplied to the dimming blocks 1700. For example, a first driving device 1610 may drive light sources 111 of a first dimming block 1710, a second dimming block 1720, a third dimming block 1730, a fourth dimming block 1740, a fifth dimming block 1750, and a sixth dimming block 1760, as illustrated in FIG. 22. The dimming blocs 1710, 1720, 1730, 1740, 1750, and 1760 driven by the first driving device 1610 may be arranged in three rows and two columns.

Electrically conductive lines 1810, 1820, and 1830 including first lines 1810 connecting between the light sources 111, second lines 1320 connecting the driving devices 1600 to the light sources 111, and third lines 1330 connecting the dimming driver 170 to the driving devices 1600 may be disposed on the first surface 112a of the substrate 112.

The first lines 1810 may connect the light sources 111, forming each of the dimming blocks 1700, in series with each other. As illustrated in FIG. 22, eight first lines 1810 may connect nine light sources 111 to each other in the form of a zigzag or the English letter "S" or the number "2" in the dimming block.

Each of the second lines 1820 may connect the driving devices 1600 to the dimming blocks 1700. The second lines 1820 may be disposed between the dimming blocks driven by a single driving device. For example, the second lines 1820 may be disposed between the dimming blocks 1710, 1720, 1730, 1740, 1750, and 1760 driven by the first driving device 1610.

The dimming blocks 1710, 1720, 1730, 1740, 1750, and 1760 may be arranged in three rows and two columns. The dimming blocks 1710, 1720, and 1730 may be disposed in the first column, and the dimming blocks 1740, 1750, and 1760 may be disposed in the second column. The second lines 1820 may be disposed between the dimming blocks 1710, 1720, and 1730 at the first column and the dimming blocks 1740, 1750, and 1760 at the second column.

The second lines 1820 may extend from the driving devices 1600 toward the dimming blocks 1700 in a specific direction. As illustrated in FIG. 22, the second lines 1820 may extend to the first dimming block 1710, the second dimming block 1720, the third dimming block 1730, the fourth dimming block 1740, the fifth dimming block 1750, and the sixth dimming block 1760 from the first driving device 1610 in the y-axis direction.

The third lines 1330 may extend from the dimming driver 170 to the driving devices 1600 to transmit the scan signal and the dimming signal of the dimming driver 170 to the driving devices 1600.

The third lines 1830 may be disposed between the dimming blocks. However, the third lines 1830 may be disposed outside the dimming blocks 1700 driven by one driving device 1600.

As shown in FIG. 22, the third lines 1830 may be disposed outside the dimming blocks 1710, 1720, 1730, 1740, 1750, and 1760 driven by the driving device 1610. In addition, the third lines 1830 may be disposed between the dimming blocks 1710, 1720, 1730, 1740, 1750, and 1760 driven by the driving device 1610 and dimming blocks 1700 driven by another driving device 1600.

As mentioned above, the second lines 1820 may be disposed between the dimming blocks 1700 driven by one driving device 1600. In addition, the third lines 1830 may be disposed between the dimming blocks 1700 driven by different driving devices 1600.

A plurality of holes 1900 may be formed on the substrate 112. Each of the plurality of holes 1900 may extend from the first surface 112a to the second surface 112b of the substrate 112 by penetrating the substrate 112.

The holes 1900 of the substrate 112 may be used to fix the substrate 112 in a process of mounting the light sources 111 and the driving devices 1600 to the substrate 112. The holes 1900 may be used as via holes.

A diameter of each of the holes 1900 may be slightly less than a distance between the light sources 111, but the holes 1900 may interfere with the arrangement of electrically conductive lines. Therefore, the holes 1900 may be disposed so as not to interfere with the arrangement of the electrically conductive lines.

Each of the holes 1900 may be disposed in the dimming blocks 1700 so as not to interfere with the arrangement of the electrically conductive lines 1810, 1820, and 1830.

As shown in FIG. 22, the light sources 111 may be arranged in rows and columns so as to be arranged in the form of a matrix, and the first lines 1810 may be disposed in the form of the English letter "S" or the number "2" along the light sources 111. Accordingly, a region, in which the first lines 1810 are not disposed, exists between the light sources 111. For example, the electrically conductive line is not disposed in a region surrounded by the four light sources 1711, 1712, 1713, and 1714 adjacent to each other in the first dimming block 1710.

Each of the holes 1900 may be disposed in a region surrounded by four light sources adjacent to each other in the dimming block. The four light sources adjacent to each other may be connected in series with each other. Accordingly, each of the holes 1900 may be disposed so as not to interfere with the arrangement of the first lines 1810, the second lines 1820 and/or the third lines 1830.

As is apparent from the above description, a display apparatus and a light source apparatus thereof may allow a hole, which is to fix a substrate to a surface mount technology (SMT) device, to be disposed at a position, in which interference with an electrically conductive line formed on the substrate is minimized.

Further, a display apparatus and a light source apparatus thereof may electrically connect a first surface and a second surface of a substrate by using a hole provided to fix the substrate to a surface mount technology (SMT) device.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a liquid crystal panel;
a plurality of light sources configured to emit light; and
a substrate comprising a plurality of dimming blocks arranged in rows and columns,
wherein each of the plurality of dimming blocks comprises at least four light sources from among the plurality of light sources, and the least four light sources are connected in series with each other and arranged in rows and columns on a first surface of the substrate,
wherein the substrate comprises a plurality of holes extending from the first surface of the substrate to a second surface of the substrate,
wherein the first surface of the substrate and the second surface of the substrate are electrically connected through the plurality of holes, and
wherein each of the plurality of holes is in a region surrounded by the at least four light sources of each respective dimming block of the plurality of dimming blocks.

2. The display apparatus of claim 1, further comprising electrically conductive lines on the first surface of the substrate,
wherein the electrically conductive lines pass between a first dimming block from among the plurality of dimming blocks and a second dimming block from among the plurality of dimming blocks.

3. The display apparatus of claim 1, further comprising electrically conductive lines provided on the substrate and connecting in series the at least four light sources of each respective dimming block of the plurality of dimming blocks,
wherein each of the plurality of holes is disposed between the electrically conductive lines.

4. The display apparatus of claim 3, wherein each dimming block of the plurality of dimming blocks comprises nine light sources arranged in three rows and three columns, and
wherein the electrically conductive lines connect in series the nine light sources in a letter "S" shape or a number "2" shape.

5. The display apparatus of claim 1, further comprising:
a first driving device configured to control a driving current supplied to at least four light sources of in a first set of dimming blocks among the plurality of dimming blocks; and
a second driving device configured to control a driving current supplied to at least four light sources of in a second set of dimming blocks among the plurality of dimming blocks,
wherein the first set of dimming blocks, the second set of dimming blocks, the first driving device and the second driving device are disposed on the first surface of the substrate.

6. The display apparatus of claim 5, further comprising first conductive lines provided on the first surface of the substrate,
wherein the first set of dimming blocks and the second set of dimming blocks are arranged in a straight line,
wherein the first conductive lines extend from the first driving device to each dimming block of the first set of dimming blocks, and
wherein the first conductive lines are between the first set of dimming blocks and the second set of dimming blocks.

7. The display apparatus of claim 6, further comprising second conductive lines configured to transmit a dimming signal to the first driving device,
wherein the second conductive lines are provided on the first surface of the substrate between the first set of dimming blocks and the second set of dimming blocks.

8. The display apparatus of claim 5, further comprising first conductive lines disposed on the first surface of the substrate,
wherein the first set of dimming blocks are arranged in a plurality of rows and a plurality of columns,
wherein the first conductive lines extend from the first driving device to each dimming block of the first set of dimming blocks, and
wherein the first conductive lines are between the first set of dimming blocks arranged in the plurality of rows and the plurality of columns.

9. The display apparatus of claim 8, further comprising second conductive lines configured to transmit a dimming signal to the first driving device, wherein the second conductive lines are provided on the first surface of the substrate between the first set of dimming blocks and the second set of dimming blocks.

10. The display apparatus of claim 5, wherein the first driving device is between the first set of dimming blocks, and the second driving device is between the second set of dimming blocks.

11. The display apparatus of claim 10, wherein a relative position of the first driving device in the first set of dimming blocks is different from a relative position of the second driving device in the second set of dimming blocks.

12. The display apparatus of claim 5, wherein each of the first driving device and the second driving device comprises:
- a first transistor comprising a control terminal;
- a capacitor connected to the control terminal of the first transistor; and
- a second transistor connected to the control terminal of the first transistor.

13. The display apparatus of claim 1, further comprising a ground plate provided on the second surface of the substrate and electrically connected to the plurality of holes.

14. The display apparatus of claim 1, wherein each light source of the plurality of light sources comprises:
- a light emitting diode provided on the substrate in chip on board (COB) method; and
- an optical dome comprising a cross section having an arc shape or a semi-circular shape.

15. The display apparatus of claim 14, wherein an intensity of a first light beam emitted from a respective light source of the plurality of light sources in a first direction perpendicular to the substrate is less than an intensity of a second light beam emitted from the respective light source of the plurality of light sources in a second direction that is different from the first direction.

16. A light source apparatus comprising:
- a plurality of light sources configured to emit light;
- a substrate comprising a plurality of holes electrically connecting the first surface of the substrate to the second surface of the substrate; and
- a plurality of dimming blocks provided on the first surface of the substrate and arranged in rows and columns,
- wherein each dimming block of the plurality of dimming blocks comprises a first plurality of light sources from among the plurality of light sources,
- wherein the first plurality of light sources of each dimming block of the plurality of dimming blocks are arranged in rows and columns on the first surface of the substrate, and
- wherein each of the plurality of holes is in a region surrounded by the at least four light sources of each respective dimming block of the plurality of dimming blocks.

17. The light source apparatus of claim 16 further comprising:
- a plurality of driving circuits provided on the first surface of the substrate, wherein each driving circuit of the plurality of driving circuits is configured to control a driving current supplied to at least one dimming block of the plurality of dimming blocks.

18. The light source apparatus of claim 17, further comprising:
- a first plurality of conductive lines provided on the first surface of the substrate,
- wherein the first plurality of light sources of a respective dimming block of the plurality of dimming blocks are connected to one another in series by conductive lines from among the first plurality of conductive lines.

19. The light source apparatus of claim 18, further comprising:
- a second plurality of conductive lines provided on the first surface of the substrate,
- wherein at least one conductive line from among the second plurality of conductive lines connects at least one driving circuit of the plurality of driving circuits to at least one dimming block of the plurality of dimming blocks, and
- wherein the at least one conductive line from among the second plurality of conductive lines is between respective dimming blocks from among the plurality of dimming blocks.

20. The light source apparatus of claim 19, further comprising:
- a third plurality of conductive lines provided on the first surface of the substrate,
- wherein at least one conductive line from among the third plurality of conductive lines is configured to transmit a dimming signal to the at least one driving circuit from among the plurality of driving circuits, and
- wherein the at least one conductive line from among the third plurality of conductive lines is disposed between respective dimming blocks from among the plurality of dimming blocks.

* * * * *